(12) United States Patent
Parish, Jr. et al.

(10) Patent No.: US 12,317,909 B2
(45) Date of Patent: Jun. 3, 2025

(54) METHODS FOR REMOVING BITTER TASTE FROM LIQUID BEVERAGES

(71) Applicants: William L Parish, Jr., Maplewood, MN (US); Martin Babcock, White Bear Lake, MN (US)

(72) Inventors: William L Parish, Jr., Maplewood, MN (US); Martin Babcock, White Bear Lake, MN (US)

( * ) Notice: Subject to any disclaimer, the term of this patent is extended or adjusted under 35 U.S.C. 154(b) by 48 days.

(21) Appl. No.: 17/235,914

(22) Filed: Apr. 20, 2021

(65) Prior Publication Data

US 2025/0008987 A1 Jan. 9, 2025

Related U.S. Application Data

(60) Provisional application No. 63/017,649, filed on Apr. 30, 2020.

(51) Int. Cl.
| | |
|---|---|
| *A23L 2/80* | (2006.01) |
| *A23F 3/20* | (2006.01) |
| *A23F 5/18* | (2006.01) |
| *A23L 27/00* | (2016.01) |
| *C12H 1/056* | (2006.01) |

(52) U.S. Cl.
CPC ............. *A23L 2/80* (2013.01); *A23F 3/205* (2013.01); *A23F 5/185* (2013.01); *A23L 27/84* (2016.08); *C12H 1/0424* (2013.01)

(58) Field of Classification Search
CPC . A23L 2/80; A23L 27/84; A23F 5/185; C12H 1/0424
See application file for complete search history.

(56) References Cited

U.S. PATENT DOCUMENTS

| | | | |
|---|---|---|---|
| 2007/0122523 A1* | 5/2007 | Cunningham | C12H 1/0408 426/11 |
| 2008/0282908 A1* | 11/2008 | Cole | A23L 2/78 99/495 |
| 2013/0122161 A1* | 5/2013 | Cole | A23L 2/70 426/271 |

FOREIGN PATENT DOCUMENTS

CN 106943878 * 7/2017

* cited by examiner

*Primary Examiner* — Anthony J Weier
(74) *Attorney, Agent, or Firm* — Mark A. Litman & Associates, P.A.

(57) ABSTRACT

An apparatus and method for the removal of unwanted taste components from beverages is described. The apparatus provides a method for contacting a oleophilic-absorbing surface and/or hydrophobic-absorbing surface of polymer media with a beverage before, during or after it is dispensed so that undesirable flavors are selectively removed from the beverage without removing desirable flavors improving the enjoyment of its consumption.

20 Claims, 6 Drawing Sheets

SECTION A-A

SECTION A-A

METHODS FOR REMOVING BITTER TASTE FROM LIQUID BEVERAGES

BACKGROUND OF THE INVENTION

1. Field of the Invention

The present invention relates to the field of beverages, particularly aqueous beverages, and more particularly to the removal of bitterness in the taste of these aqueous liquid beverages.

BACKGROUND

There are many different kinds of beverages for human consumption. Some are natural juices, some are fermented, others are manufactured, and some are brewed from natural or altered natural ingredients. Among the range of beverages are juices, wines, liqueurs, brandy, whiskey, vodka (and other hard liquors), beer, ale, tea and coffee. During preparation or aging of these materials, there are many chemical changes that occur. Some of these changes improve the taste and quality of the beverage, but others create adverse effects such as bitterness. Tea is a popular beverage that has been consumed by people for over 2000 years. It is the second most popular beverage in the world after water and is consumed by tens of millions of people every day. There are many different types of teas produced most of which come from 2 different plants—*Camellia Sinensis* var *Sinensis* a small leaf variety that does well in cooler mountainous regions like central China, Japan and Turkey and *Camellia Sinensis* var *Assamica* a broad leaf variety that does well in moist tropical regions like India, Ceylon, and Szechuan and Yunnan provinces of China. The leaves from these two plants are used to make most of the different types of tea produced commercially such as black tea, white tea, green tea, oolong tea, and pu-erh tea. The characteristics of these different teas is determined by the variety of tea selected, the environment in which the tea plant is grown, and the processing the tea leaf is put through. These different characteristics result from differences in the biochemical compounds produced in the tea by the above variations noted.

While being a beverage enjoyed by millions, there are some characteristics of the tea infusion in water that are considered undesirable by many people. A main drawback commonly experienced in tea is a bitter taste which can develop when teas are brewed at higher temperatures or from the composition of the tea. Many teas come with recommended brewing temperatures to try and avoid some of this bitterness among other things. This is difficult to do and does not always yield consistent results. A more convenient method would be if there was a way to brew the tea without trying to control the temperature which always results in a nice smooth tasting non-bitter cup of tea.

Tea is composed of literally thousands of different compounds. While tea has been consumed for thousands of years it is only recently that detail analytical techniques have been employed to learn more about the actual chemical makeup of tea. Some of the major phytochemical constituents of tea are contained in Table 1. Typical percentages of these phytochemicals found in black tea and green tea are given to illustrate the differences produced in the different types of tea.

TABLE 1

Composition of a Typical Tea Beverage (% wt/wt solids)

| Component | Green Tea | Black Tea |
|---|---|---|
| Catechins | 30% | 9% |
| Theaflavins | — | 4% |
| Simple Polyphenols | 2% | 3% |
| Flavonols | 2% | 1% |
| Other Polyphenols | 6% | 23% |
| Theanine | 3% | 3% |
| Amino acids | 3% | 3% |
| Peptides/Protein | 6% | 6% |
| Organic Acids | 2% | 2% |
| Sugars | 7% | 7% |
| Other Carbohydrates | 4% | 4% |
| Lipids | 3% | 3% |
| Caffeine | 3% | 3% |
| Other Methylxanthines | <1% | <1% |
| Potassium | 5% | 5% |
| Other Minerals/Ash | 5% | 5% |
| Aroma Compounds | Trace | Trace |

Table 1 represents just the broad categories of phytochemicals in the teas described. There are many different phytochemicals in each group numbering in the thousands as previously mentioned. The source of the bitter taste in tea is difficult to pinpoint. The literature points out a number of different compounds that could be responsible for creating the bitter taste in tea such as the methylxanthines. It's possible that the exact compound that comes through strongly as bitter tasting has not been identified yet as it's possible a compound present in very low concentration but possessing an extreme bitterness is responsible as was discovered in coffee beverages.

Herbal teas are beverages made from the infusions of herbs, spices, other plant materials in hot water. Herbal teas or Tisanes can contain spice, flowers or flower parts, fruit or fruit parts, leaves of various plants, seeds, and/or roots. Brewing these components can lead to beverages with bitter taste components which can be removed by this invention. One herbal ingredient, Kava Root, when translated from the Tongan language means "Bitter"!

Like tea, coffee is a very popular beverage consumed by millions of people every day. Many people start their day with their favorite coffee beverage and will consume several more during the day. Many coffee bars such as Starbucks and Caribou have proliferated across the country and world with many other local establishments providing the daily cup of coffee. Legends have it that the coffee beverage started in the goat herding country of Ethiopia when a goat herder noticed his goats becoming very energetic after consuming the red berries (coffee beans) from a plant growing in the area. The roasting of the beans was a further accident emitting the rich aroma we all associate with coffee today and the beverage was born. The consumption of coffee then spread from Ethiopia to Egypt through the Ottoman Empire on to Europe and eventually South America resulting in the multi-billion dollar industry that exists today.

There are 4 main types of coffee beans. The most popular bean is the *Arabica* bean representing about 60% of the coffee bean market. It grows at high altitude in shaded areas where rainfall occurs regularly. Its drawback is it is prone to disease so in areas where it is densely grown there have been incidents of disease breakout which reduced the production of the bean. The second most popular bean is the *Robusta* bean. As the name implies this variety is more disease resistant. It generally grows in a hot climate with irregular rainfall. This bean contains 2x's the caffeine as the *Arabica* bean which imparts some of the disease resistant to the plant. A less well known bean is called *Liberica*. This bean was important historically but is not cultivated as much now grown mainly in the Philippines. The final bean is the Excelas grown mainly in Southeast Asia and accounts for about 7% of modern production.

While very popular in its many different forms and formulations coffee also has the downside of tasting bitter frequently. Other condiments and flavorings such as sugar and cream are used perhaps at least partially to conceal the bitterness in that morning cup. Many coffee formulations contain flavor enhancing ingredients that attempt to partially conceal the bitterness of the coffee such as French Vanilla, Amaretto, Caramel Cream, Hazelnut, Irish Cream, Swiss Mocha Almond and make the coffee beverage more enjoyable.

Fruit juices are another popular beverage with orange juice being the fruit juice with the greatest consumption. A number of different orange types are used to make this popular drink. Similar to coffee and tea, orange juice is a complex mixture of different phytochemical compounds. The most popular orange fruit types for producing juice are the Pineapple Orange, the Valencia Orange and the Washington Navel Orange. Various studies have shown a complex mixture of different components responsible for the flavor and aroma of orange juice numbering over 40 different compounds. During storage, the development of off flavors has been attributed to a number of different compounds and reactions such as the Maillard Reaction and Stricker Degradation. Some of these off-flavor producing compounds are known to produce a bitter flavor to the juice such as Limonin. If these off flavor producing compounds could be reduced or removed from the fruit juice before consumption, there would be substantial benefit to the consumer.

It is also known that Abstract Sensory-guided fractionation of a roasted coffee brew by means of sequential solvent extraction, ultrafiltration, and RP-HPLC demonstrated a group of ethyl acetate soluble compounds formed from O-hydroxycinnamoyl quinic acid derivatives upon coffee roasting as the key compounds contributing to the bitter taste of roasted coffee beverages. LC-MS/MS studies, 1D- and 2DNMR spectroscopy, syntheses, and model roast experiments with 5-O-caffeoyl- and 5-O-feruloylquinic acid led to the unequivocal identification of 3-O-caffeoyl-γ-quinide, 4-O-caffeoyl-γ-quinide, 5-O-caffeoylepi-8-quinide, 4-O-caffeoyl-muco-γ-quinide, 5-O-caffeoyl-muco-γ-quinide, 3-O-feruloyl-γ-quinide, and 4-O-feruloyl-γ-quinide as intense coffee bitter tastants. Besides these individual bitter compounds, a highly complex and intensely bitter HPLC fraction was isolated from the ethyl acetate extractables of coffee brew. Application of COSY spectroscopy and alkaline hydrolytic degradation gave strong evidence that the bitter taste of that fraction is due to a multiplicity of rather complex quinic acid lactone isomers multiply esterified with p-coumaric acid, caffeic acid, ferulic acid, 3,4-dimethoxycinnamic acid, and quinic acid, respectively. As representatives of this fraction, 3,4-O-dicaffeoyl-γ-quinide, 3,5-O-dicaffeoyl-epi-8-quinide, and 4,5-O-dicaffeoyl-mucoγ-quinide have been isolated, purified, and identified as strongly bitter-tasting compounds in roasted coffee.

Wines can also have or develop off flavors. Off flavors are most noticeably produced in wine that has been exposed to air for an extended period of time as happens with bottles of wine that are opened but not completely consumed and then stored for a number of days without reducing or eliminating or preventing exposure to oxygen. Off flavors in wine exposed to air for extended period can be caused by excess production of acetaldehyde caused by oxidation of the ethanol in the wine. Certain Catechins are also known to produce bitter flavors in wine. Again the consumer would benefit from a better tasting beverage if these off flavor compounds could be removed from the wine before it was consumed. It is possible to reduce or prevent the formation of these off flavors in wine through the use of a wine preservation device like the Coravin™ or Wine Squirrel™ devices. These devices however are complex to use for the consumer and in some cases require the additional purchase of gas cartridges adding to the expense of the device. A simpler point of use device that is reusable would offer value to the consumer anxious to improve the quality of the beverage they consume.

In addition to treating a bottle of wine that has been previously opened to remove off-tastes, a freshly opened bottle of wine can also benefit from this new device. It is not unusual for a freshly opened bottle of red wine to have a bitter after taste which can be removed if first treated by flowing the wine through a filter containing the inventive absorbent/adsorbent.

Various kinds of other fermented beverages like wine can also benefit from removal of bitter and other undesirable tastes such as beer in its many variations and mead, sake, cider.

Another food and beverage that traditionally has a bitter taste associated with it is chocolate or hot chocolate beverage. For example, the bitter taste of a cup of dark chocolate hot chocolate mix can be removed by treatment with the inventive absorbent/adsorbent for a few seconds before consuming revealing the rich full taste of the chocolate.

These beverages-tea, coffee, fruit juice, chocolate, wine, and including alcoholic beverages and all their formulations can benefit from a device that can remove the compounds responsible for producing a bitter or other unpleasant tastes in the beverage. To date the bulk of the research into improving the taste or aftertaste of these beverages has involved additives that can be added to the beverage to improve its taste or aftertaste. U.S. Pat. No. 9,545,119 describes a taste enhancer that uses vanillyl ligands to improve unpleasant tastes such as bitter, astringent, and/or metallic tastes or aftertastes.

U.S. Pat. No. 8,685,436 describes a taste improver that uses hydroxyflavanones their salts and stereoisomers to reduce bitter and/or metallic tastes or aftertastes. There are many patents that have been written in the area of taste modifiers whose purpose is to improve the taste of a beverage or food by adding an ingredient that modifies the taste of the food or beverage improving the experience for the consumer.

U.S. Pat. No. 4,988,532 describes the addition of a flavor enhancer sclareolide to coffee and other foods to reduce bitterness and enhance the flavor of the food. Patents of this category of taste modifiers includes 5700792, 5665755, 5654311, 5650403, 5646122, 5643956, 5643955, 5643945, 5643941, 5643894, 5641812, 5641811. There are many more materials of this type that involves the addition of a material to the beverage or food to have the desired effect of reducing the bitterness of the food item.

A better alternative would be if the bitter tasting components of the beverage or food could be removed from the food item by some means without adding anything foreign to the food or beverage. A number of patents have been written describing fairly complex processes for the purpose of extracting a bitter tasting ingredient from the food or beverage. U.S. Pat. No. 6,544,577 describes the removal of bitter tasting compounds naringin and limonin from citrus juice-especially grapefruit juice-using a membrane filtration process and diafiltration process to remove the bitter tasting compounds from the juice.

U.S. Pat. Nos. 6,908,637 and 7,081,264 describe a process to debitter peanut hearts using a water based alkaline wash solution and ultrafiltration process to remove the bitter tasting compounds in the peanut hearts. U.S. Pat. No. 5,263,409 describes a membrane extraction process for removing bitter tasting compounds from citrus juice. The processes referenced above are complex and take place on a large industrial scale. These processes would not be suitable for debittering a single serving of a desired beverage such as tea, coffee, fruit juice, chocolate, or alcoholic beverage.

Absorption of bitter tasting compounds is another technique to separate the bitter tasting compounds from the desired beverage or food. U.S. Pat. No. 4,439,458 describes the absorption of bitter tastes caused by flavonoid and limonoid compounds from a citrus juice using a chloromethylated styrene divinylbenzene copolymer resin called Duolite S 861. Before the juice can be treated by the resin it must be clarified by removing the pulp in the juice. The pulp is then reintroduced after treatment by the resin. The problem with this process is that some of the bitter tasting limonin is reintroduced by the pulp resulting in a juice that still has a bitter taste. Another problem with this process is that the resin must be first treated with a water-soluble alcohol before being used to treat the juice to remove any hazardous monomer residues. Handling this flammable solvent is a problem for the typical juice plant.

U.S. Pat. No. 4,965,083 describes the removal of bitterness compounds from citrus juice using a crosslinked styrene divinylbenzene copolymer resin functionalized with dimethyl, trimethyl, or dimethylethanolamine functional groups. U.S. Pat. No. 4,514,427 describes the removal bitter flavor components naringin and limonin from citrus juice using a weak base anion ion exchange resin. The problem with this process is that the weak base anion ion exchange resin will absorb a lot of citric acid from the juice and result in raising the pH of the juice above 7 which can cause the denaturing of proteins in the juice. These denatured proteins can form gels which tend to plug the resin and are difficult to remove forcing the replacement of the expensive resin. U.S. Pat. No. 4,965,083 describes an ion exchange resin for removing the bitter compounds limonin and naringin from citrus juice. It is produced by post crosslinking the resin polymer in a swollen state followed by a chloromethylation step and then a step to functionalize the resin. This is a complex process which increases the cost of the resin. Regeneration of the exhausted resin requires treatment of the resin by a chemical (acid/alkaline) and then rinsing of this chemical from the resin. U.S. Pat. No. 4,024,334 describes the removal of limonin from citrus just by treatment with a cellulose ester gel resin which can be regenerated by rinsing with water. The disadvantage of this process is that only limonin removal is claimed from the juice. The resin is also made by dissolving the cellulose ester in a toxic solvent which must then be leached out before using to contact the juice.

All of these absorption processes have been developed to debitter citrus juices and are large complex industrial processes that take place within large food processing plants utilizing materials made from and functionalized in complex chemical processes. Nothing has been found for debitter of beverages like tea, coffee, and wine and nothing for a citrus juice that takes place outside of a factory. Nothing that can be used to treat a glass of a fruit juice after the consumer has purchased a bottle of juice and left the juice in their refrigerator after opening it. Also, nothing has been found to remove the bitterness in a cup of tea or your morning or afternoon cup of coffee that can be used by the consumer and is easily regenerated for continuous use over a significant length of time before replacement.

Alcoholic beverages distilled from fermented gain mash such as barley, buckwheat, corn, millet, rice, rye, sorghum, wheat to produce products like scotch, gin, vodka, bourbon, Irish whiskey, rye whiskey, blended whiskeys and beverages distilled from fruit like applejack, brandy, cognac, gin, beverages distilled from vegetables like tequila, mezcal, vodka, rum and many other types of alcoholic beverages can benefit by the removal of bitter, chemical, and other off tastes by treatment with this inventive device.

Patent application Ser. No. 20130149423 describes a process for modifying the taste of a whisky product to produce a smoother tasting whiskey which mimics a whiskey that has been aged for a much longer period of time—an accelerated aging process for whiskey. The disadvantage of this process is it requires large and complex equipment in an industrial setting and is not suitable for point of use application. Even though the process is accelerated a significant number of months is needed to achieve the desired result. Patent CN1402779 describes another accelerated aging process for more rapidly aging all types of whiskeys, tequilas, brandys, cognac, rum, mescal, wines by adding wood particles and ethyl acetate in a controlled heating process to deliver the taste profile of an alcoholic beverage in a much compressed time frame. Again the disadvantage of this process is the addition of other materials and chemicals to the beverage to effect the change. The process also takes place in a complex process type plant where temperature and oxygen levels must be carefully controlled and is not suitable for a point of use product. Additional patents on the accelerated aging of alcoholic beverages includes a number of patents claiming an improvement of taste through the use of actinic radiation in a specific frequency range such as U.S. Pat. Nos. 3,787,587, 9,637,712, and 10508259. The disadvantage of these processes is again the complex equipment containing specialized reaction chambers needed to achieve the desired results. Hydrodynamic cavitation process described in U.S. Pat. No. 9,474,301 describes the use of energy resulting from the collapse of bubbles and the high pressure and temperatures created to create chemical changes in the beverage to enhance its flavor. These processes again require complex specialized reaction chambers in industrial settings to achieve the desired results. Ultrasonic energy is also employed in a similar process in U.S. Pat. No. 7,220,439 with the same drawback of a complex reactor not suitable for a point of use device.

U.S. Pat. No. 6,287,614 describes the use of a powerful magnetic field to alter the level of tannins in wine beverages to improve its taste. A disadvantage of this device is that an extended period of time up to 30 minutes of exposure to the magnetic field is required to achieve the desired result of improved taste.

All of the processes described above are attempts at improving the taste of different beverages like tea, coffee, fruit juices, chocolate, wine and other alcoholic beverages. They all involve either additions made to a beverage composition or a complex remote process to effect the desired change. None of the prior art describes a simple point of use device that can be used by the consumer at the time they are consuming the beverage that can rapidly enhance the flavor of the beverage experienced by the consumer and is re-useable as is described in this new and surprisingly versatile flavor enhancing invention.

All documents cited in this application are incorporated by reference in their entireties.

SUMMARY OF THE INVENTION

The present invention solves the problem of beverages containing a bitter, sour, chemical, or other unpleasant tastes by providing a portable, re-usable, point of use device and an absorbent/adsorbent for the treatment of a beverage before, during, or after dispensing to remove bitter, sour, acid, chemical and other unpleasant tastes from the beverage before consumption. In one embodiment, the device consists of an absorbent/adsorbent resin contained in a holder with an inlet to allow the beverage to flow into the area containing the absorbent/adsorbent and a flow path that carries the beverage through the resin bed exposing it to the absorbent/adsorbent and an exit that directs the flow of the beverage into a receiver like a glass.

A second embodiment of the device consists of a holder for the absorbent/adsorbent resin surrounded by a porous screen to allow the beverage to enter the area with the absorbent resin with a handle for gripping that allows the device containing the resin to be immersed into a cup or glass of the beverage and stirred around in the beverage exposing the beverage to the absorbent as it flows through the screen like material. Many different embodiments of the basic device are possible. The 2 embodiments mentioned above are 2 non-limiting examples of the device.

In another embodiment, the absorbent/adsorbent resin is built into the holder for a filter in a coffee making machine like the Cuisinart model DCC-3850 where—as the coffee is brewed by hot water flowing over the coffee grounds as the water exits the coffee ground area it flows into and through an area containing the absorbent/adsorbent resin removing the undesired bitter flavor of the coffee.

Another embodiment of the invention is either a disposable or re-useable K cup type coffee or other hot beverage containing cartridge like those used in a Keurig type coffee maker. The cartridge containing the beverage ingredients would have another chamber where the hot water after passing through the beverage ingredients would enter the absorbent/adsorbent resin bed where the bitter and other undesirable flavor components would be removed.

These embodiments are illustrative of the invention and not meant to limit the application of the invention in any way. Those skilled in the art can devised many other configurations in which the benefits of this invention can be realized which would not deviate from the intention of the inventors.

Unlike the prior art inventions for removing the bitter tasting compounds from citrus juice which take place in large industrial processing factories, this invention is a small simple device which can be used for an individual glass of juice, wine, cup of coffee, or cup of tea or other beverage by the consumer at their kitchen table just prior to consuming. The absorbent/adsorbent can be used to treat multiple cups/glasses of beverage but if the absorbent/adsorbent effect decreases the absorbent/adsorbent can be easily regenerated by rinsing in hot tap water or if additional cleaning is desired, the device can be cleaned with simple dishwashing soap either in a sink or in a dishwasher. Regenerating the resin restores the absorbent/adsorbent capability of the resin to treat more servings of the desired beverage eliminating the need to dispose of the device improving the economics and environmental impact of the invention. In addition to beverages, soups, liquid foods (energy drinks, protein beverages, etc.), dressings (e.g., balsamic vinaigrette, oil and vinegar, etc.) and condiments may be treated. The technology generically includes edible and potable liquids.

The absorbent/adsorbent resin is preferably a polyolefin resin particle. The particle can be in different shapes such as rods, fibers, spherical like, spherical or other shapes and configurations. The particle can be a solid material or porous. The polyolefins useful in this invention include polypropylene homopolymer-atactic, syndiotactic, isotactic, polypropylene copolymer, high density polyethylene, low density polyethylene, polyethylene copolymer, polybutylene (polybutene-1), EPDM (ethylene propylene diene monomer), polymethyl pentene, copolymers of polyolefins, mixtures of polyolefins resins, polyolefins made by Ziegler-Natta catalysts, polyolefins made by metallocene catalysts, other polyolefins and polyolefin copolymers. The preferred polyolefin for this invention is isotactic polypropylene homopolymer. The resin can contain other additives such as fillers, pigments, processing aids, antistatic agents, surfactants, surface treatments, antimicrobials and other functional groups compatible with the intended function of the invention as long as these materials are acceptable and safe for contact with food.

Polypropylene is hydrophobic in nature and as such it has known uses as an oil adsorbent for removing oil from a surface or oil that is phase separated and floating on the surface of water. This invention while it will adsorb oil that is phase separated and floating on water as happens in brewing hot tea, it has been surprisingly found that the adsorbent will adsorb the oil compounds while they are still miscible with water at an elevated temperature. The oils in the tea are found to be miscible at temperatures above approximately 160° F. below this temperature the oil phase separates and forms a film on top of the water in the cup of tea. Treating the brewed cup of tea with the polypropylene absorbent/adsorbent at temperatures above 160° F. no oil film is seen to form on the surface of the tea after the tea cools to below 160° F. The removal of the oils in tea seems to be a separate operation than removing the bitter or other unpleasant tastes from the tea. A different resin that removed the oil from the tea did not remove the unpleasant taste from the brewed tea indicating the oil film and the unpleasant tastes are caused by different compounds.

DETAILED DESCRIPTION OF THE INVENTION

Figure 1:
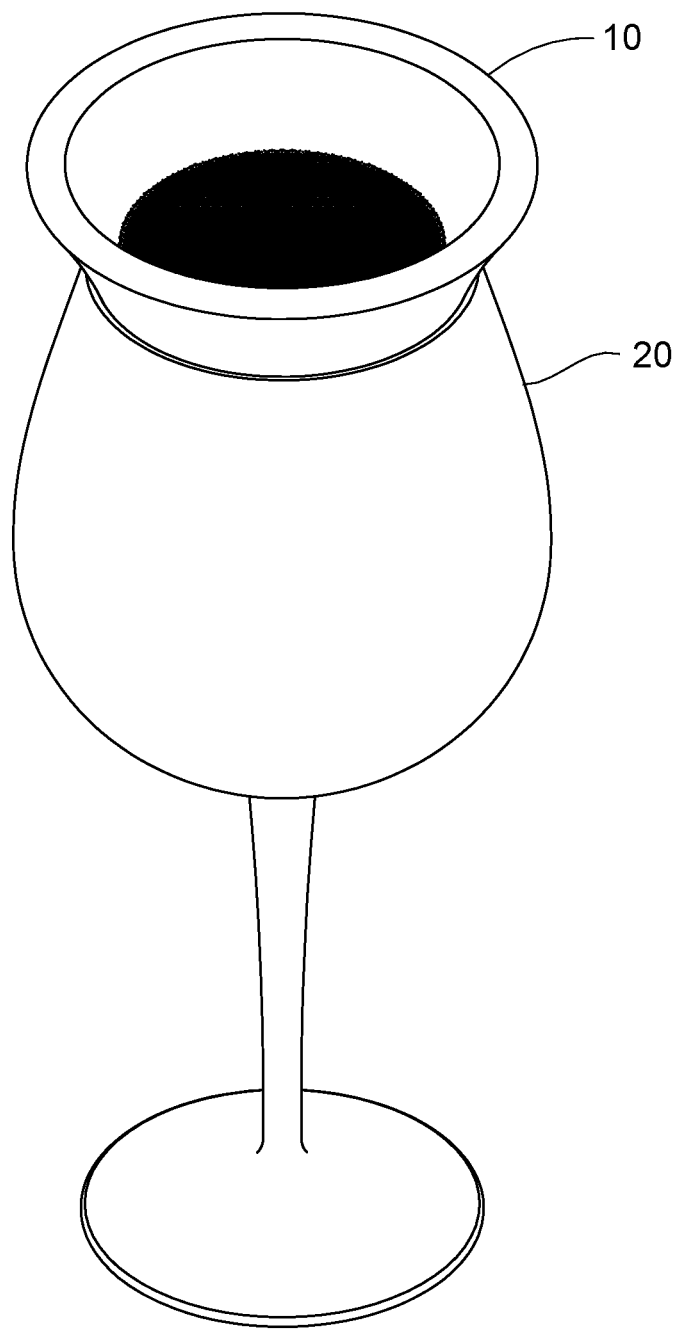
FIG. 1 shows a flow through point of use device for treating a glass of wine.

This invention relates to the treatment of beverages by an absorbent/adsorbent to remove unpleasant tastes such as bitter, sour, acidic, chemical, or other unpleasant tastes and/or aftertastes. The invention works on a wide range of beverages such as tea, coffee, wine, chocolate drinks, fruit juice, all types of alcoholic beverages. What is most surprising is that each of these beverages are composed of complex mixtures of hundreds if not thousands of different compounds and the absorbent/adsorbent has the ability to remove the components with the unpleasant taste without removing the compounds responsible for the desired taste thus enhancing the experience of consuming the beverage. This invention is useful for treating the beverage during or after brewing as in the case of tea and coffee, just after opening a container of the beverage such as for wine or fruit juice or for treating a beverage after its container was opened and then the beverage was stored for a period of time exposed to air before consuming the balance of bottle or container. The absorbent/adsorbent could also be used in more of a commercial production facility such as a coffee shop or fruit juice processing facility.

The invention is useful for all kinds of beverages and variations among beverages including among the variety of teas such as black, green, oolong, white, pu-erh, and herbal teas and tea blends and teas made by various production techniques and blends of these teas and beverages composed of tea and other flavoring ingredients. It is also useful for all types of coffee made from different bean types and roasting techniques and coffee compositions containing coffee and other ingredients and flavoring ingredients. All types of wine-red, white, rose, wine blends and beverages, and other alcoholic beverages distilled from fermented gain mash such as barley, buckwheat, corn, millet, rice, rye, sorghum, wheat to produce products like scotch, gin, vodka, bourbon, Irish whiskey, rye whiskey, blended whiskeys and beverages distilled from fruit like applejack, brandy, cognac, gin, beverages distilled from vegetables like tequila, mezcal, vodka, rum, blends of alcoholic beverages with other flavoring components such as fruits and others and many other types of alcoholic beverages can benefit by the removal of bitter, chemical, and other off tastes by treatment with this inventive device. Fruit juice also benefits from treatment with this absorbent/adsorbent as can chocolate and chocolate drinks and other beverages.

Many types of compounds found in beverages are known to have a bitter, sour or other off flavor taste. There may be other bitter, sour or off flavor producing compounds found in beverages that are unknown waiting to be discovered. Some bitter tasting compounds can have an effect on the flavor of a beverage although they are present in very low concentrations making them difficult to isolate and identify. It is not known what compounds the absorbent/adsorbent removes from the various beverages, but the effect it has on the beverages is detectable through tasting of the beverage.

Although Applicant suggests the following theory for activity in the practice of the present invention, Applicant is not to be limited or held to this sole description, provided to offer insight into how the practice of the present invention may operate.

Adsorption is the adhesion of ions or molecules onto the surface of another phase. Adsorption may occur by way of physisorption and chemisorption. Ions and Molecules can adsorb to many types of surfaces including polymer surfaces. A polymer is a large molecule composed of repeating subunits bound together by covalent bonds. The adsorption of ions and molecules to polymer surfaces plays a role in many applications including: biomedical, structural, and coatings.

Polymers from a single species of monomer are homopolymers, and polymers with at least two different reactive monomers are copolymers.

Polymer surfaces differ from non-polymer surfaces in that the subunits that make up the surface are covalently bonded to one another. Non-polymer surfaces can be bound by ionic bonds, metallic bonds or intermolecular forces (IMFs). In a two-component system, non-polymer surfaces form when a positive net amount of energy is required to break self-interactions and form non-self-interactions. Therefore, the energy of mixing ($\Delta_{mix}G$) is positive. This amount of energy, as described by interfacial tension, varies for different combinations of materials. However, with polymer surfaces, the subunits are covalently bonded together and the bulk phase of the solid surface does not allow for surface tension to be measured directly. The intermolecular forces between the large polymer molecules are difficult to calculate and cannot be determined as easily as non-polymer surface molecular interactions. The covalently bonded subunits form a surface with differing properties as compared to non-polymer surfaces. Some examples of polymer surfaces include: polyvinyl chloride (PVC), nylon, polyethylene (PE), and polypropylene (PP). Polymer surfaces have been analyzed using a variety of techniques, including: scanning electron microscopy, scanning tunneling microscopy, and infrared spectroscopy.

Adsorption Isotherms

The adsorption process can be characterized by determining what amount of the ions or molecules are adsorbed to the surface. This amount can be determined experimentally by the construction of an adsorption isotherm. An adsorption isotherm is a graph of $\Gamma(P,T)$ versus partial pressure of the adsorbate ($P/P_0$) for a given constant temperature, where $\Gamma(P,T)$ is the number of molecules adsorbed per surface area. As the partial pressure of the adsorbate increases, the number of molecules per area also increases.

Contact Angle and Surface Tension

Contact angle, the angle at which a liquid droplet meets at a solid surface, is another way to characterize polymer surfaces. Contact angle ($\theta$) is a measure of the wetting ability of the liquid on a solid surface. Generally, due to low surface energy, liquids will not wet polymer surfaces and the contact angle will be greater than 90°. The liquid molecules are more attracted to other liquid molecules as compared to the polymer surface. Because the polymer surfaces are solid surfaces, surface tension cannot be measured in a traditional way such as using a Wilhelmy plate. Instead, contact angles can be used to indirectly estimate the surface tension of polymer surfaces. This is accomplished by measuring the contact angles of a series of liquids on a polymer surface. A Fox and Zisman plot of cos θ versus surface tensions of the liquids (YL) gives a straight line which can be extrapolated back to determine the critical surface tension of the solid (Yc).

Some estimated meaningful surface tensions of different polymers are shown below.

| Polymer | $\gamma_{c(mN/m)}$ |
|---|---|
| Polystyrene (PS) | 40.7 |
| Polyvinylacetate (PVA) | 36.5 |
| Teflon ™ | 20 |

-continued

| Polymer | $\gamma_{c(mN/m)}$ |
|---|---|
| Polymethylacrylic acid (PMMA) | 41 |
| Polypropylene | 33 |
| Silicone | 24 |
| Polyimide | 40 |
| Nylon 6/6 | 41 |
| Polyacrylamide | 56 |

Polypropylene (PP), also known as polypropene, is a thermoplastic polymer used in a wide variety of applications. It is produced via chain-growth polymerization from the monomer propylene.

Polypropylene belongs to the group of polyolefins and is partially crystalline and non-polar. Its properties are similar to polyethylene, but it is slightly harder and more heat resistant. It is a white, mechanically rugged material and has a high chemical resistance. Polypropylene is the second-most widely produced commodity plastic (after polyethylene) and it is often used in packaging and labeling. In 2019, the global market for polypropylene was worth $126.03 billion.

Polypropylene is in many aspects similar to polyethylene, especially in solution behavior and electrical properties. The methyl group improves mechanical properties and thermal resistance, although the chemical resistance decreases. The properties of polypropylene depend on the molecular weight and molecular weight distribution, crystallinity, type and proportion of comonomer (if used) and the isotacity. In isotactic polypropylene, for example, the methyl groups are oriented on one side of the carbon backbone. This arrangement creates a greater degree of crystallinity and results in a stiffer material that is more resistant to creep than both atactic polypropylene and polyethylene.

When polypropylene film is extruded and stretched in both the machine direction and across machine direction it is called biaxially oriented polypropylene. Biaxial orientation increases strength and clarity. BOPP is widely used as a packaging material for packaging products such as snack foods, fresh produce and confectionery. It is easy to coat, print and laminate to give the required appearance and properties for use as a packaging material. This process is normally called converting. It is normally produced in large rolls which are slit on slitting machines into smaller rolls for use on packaging machines.

Detailed Description of the Generic Classes of Polyolefins Useful within the Scope of the Invention 1. Polyolefin Classes:
   1.1 Ethylene polymers and copolymers.
   1.2 Propylene polymers and copolymers
   1.3 Ethylene/propylene elastomers & synthetic rubbers
   1.4 Polymers and copolymers of higher alpha olefins
   1.5 Polymers and copolymers of cycloolefins and cyclodiolefins
   1.6 Polymers formed from blends of 2 or more alpha olefins
2. Materials
   2.1 Polyethylene
      2.1.1 Low density polyethylene
      2.1.2 Linear low density polyethylene
      2.1.3 Very low density polyethylene
      2.1.4 Medium density polyethylene
      2.1.5 High density polyethylene
      2.1.6 Ultra high density polyethylene
      2.1.7 High density crosslinked polyethylene
      2.1.8 Crosslinked polyethylene
      2.1.9 Polyethylene copolymers
         2.1.9.1 Ethylene/1-hexene
         2.1.9.2 Ethylene/1-octene
         2.1.9.3 Ethylene/1-dodecene
         2.1.9.4 Other ethylene copolymers-see entries below
   2.2 Polypropylene
      2.2.1 Isotactic polypropylene
      2.2.2 Atactic polypropylene
      2.2.3 Syndiotactic polypropylene
      2.2.4 Propylene/ethylene copolymer
      2.2.5 Propylene/1-butene copolymer
      2.2.6 Propylene/1-hexene copolymer
      2.2.7 Propylene/ethylene/1-butene terpolymer
      2.2.8 High Impact polypropylene (heterophasic copolymer Homopolypropylene shell with propylene/ethylene or ethylene/1-butene bipolymer core)
   2.3 Ethylene/propylene elastomers
      2.3.1 Ethylene/propylene copolymer
      2.3.2 Ethylene/propylene/diene copolymer
   2.4 Polymers of Higher Alpha Olefins
      2.4.1 Poly(1-butene)
      2.4.2 Poly(1-pentene)
      2.4.3 Poly(3-methyl-1-butene)
      2.4.4 Poly(1-hexene)
      2.4.5 Poly(3-methyl-1-pentene)
      2.4.6 Poly(4-methyl-1-pentene)
      2.4.7 Poly(1-heptene)
      2.4.8 Poly(3-methyl-1-hexene)
      2.4.9 Poly(4-methyl-1-hexene)
      2.4.10 Poly(1-octene)
      2.4.11 Poly(5-methyl-1-heptene)
      2.4.12 Poly(vinyl cyclohexene)
      2.4.13 Poly(1-decene)
      2.4.14 Copolymers of 4-methyl-1-pentene/alpha olefins c2-c20
   2.5 Polymers of Cycloolefins
      2.5.1 Diiso-poly(cyclobutene)
      2.5.2 Diiso-poly(cyclopentene
      2.5.3 Poly(norbornene)
      2.5.4 Norbornene/ethylene copolymers
      2.5.5 Polytetracyclododecene
      2.5.6 Tetracyclododecene/ethylene copolymers
      2.5.7 Polydicyclopentadiene
      2.5.8 Polyoctenamers (Polymers of cyclooctene)
   2.6 Blends of 2 or more alpha olefins, higher alpha olefins
3. Major Suppliers of polyolefins Exxon-Mobile; Dow Dupont; Sinopec Corporation; Total SA; Arkema SA; Lyondell-Basel; Sabic; Chevron Phillips Chemical Company; Repsol; Reliance Industries; INOES; Formosa Plastics; Borouge; Borealis; Braskem; CNPC; Ethyl Corp; Shell Chemical Spolana; Idemistsu; Mitsubishi Chemicals; Sasol; Mitsui Chemical; Nippon Zeon; Ticona Celeanese; Flint Hills Resources; Eastman Chemicals; Formosa Plastics; and ENI Versalis.

The main classifications of adsorbent polyolefins may be summarized as follows:

1. Ethylene polymers and copolymers
2. Propylene polymers and copolymers
3. Ethylene/propylene elastomers and synthetic rubbers
4. Polymers and copolymers of higher alpha olefins
5. Polymers and copolymers of cycloolefins and cyclodiolefins
6. Thermal blends of 2 or more alpha olefins, higher alpha olefins The specific compounds we have found useful in treating specific beverages are listed now.
1. Polypropylene homopolymer-orange juice, balsamic vinegar
2. Propylene/ethylene copolymer-coffee, tea
3. ethylene/norbornene cyclic olefin-wine finish and spirits
4. propylene/ethylene copolymer+poly-(4-methyl-1-pentene)+ethylene/norbornene cyclic copolymer-wine finish These are the primary compounds being used within the generic scope of polyolefins which are being used now to modify the taste of various beverages and food items, beyond the specific beverages identified. The polyolefins cited and their specifically identified beverages are not exclusive and possibly not optimized. They have, however, been found to be highly effective with the specifically identified combinations.

The present technology is performed by having the adsorbent polymer present in the beverage either during its brewing in a closed environment (e.g., tea pot, coffee brewer, cup and the like), during its transport after brewing to the beverage container (e.g., tubes, pipes, spigot, flask, etc.) or in the final container from which the drinker imbibes the beverage without further brewing (e.g., cup, bottle, flask, glass, etc.). Contact with the liquid may be provided with porous sheet of the polymer, a bed of polymer particles and/or of fibers, a polymer fabric, or a fabric containing strips or fibers of the polymer.

The liquid with at least some of the brewed beverage must be contacted with the surface of the polymer. This can be done while the beverage is being brewed by having the polymer in the brewing environment (as a porous sheet, as a particle bed, as a fabric, as an implement placed within the liquid containing these items, or as a lining on the walls of the brewing apparatus). In the transport mode, the liner of the carrier may have strips or a lining thereon, there may be filters of the polymer across the transport diameter, or the flow path may have multiple cannula made of the polymer. The final beverage can be treated in the final serving (pot, kettle, flask, decanter, bottle, pitcher) element by stewing the polymer element or material for a modest time within serving device or by pouring liquid through a bed of polymer particles into a suitable receiver like a glass, cup, pitcher, decanter or mug or other container. When bottled beverages are prepared, the brewed beverage may have a longer dwell time with the polymer before being bottled. With beverages to be served hot, the dwell time will tend to be shorter, such as two minutes or less so that the beverage does not cool down (unless in an insulated container, where longer dwell times may occur). Longer dwell times in an open beverage container may be used at the sacrifice of some warmth in the beverage. The beverage could be heated again, but this in itself may cause some level of bitterness, especially where European brewed with leaves or beans remaining in the beverage after initial brewing.

Bitter compounds in the tea and other beverages tend to be hydrophobic compounds contained in an aqueous solution. Hydrophobic compounds in water will tend to clump together in an attempt to reduce their surface area exposed to the water and decrease the entropy of the system. Adsorbing onto a flat surface or relatively flat surface would require an increase in surface area in contact with the aqueous solution and is not generally favored. The polypropylene polymer in bead form however are roughly spherical in shape and afford a better surface to adsorb onto in that the surface area in contact with the water would be minimized. Polypropylene is also a non-polar surface which would be more compatible for a hydrophobic compound to adsorb onto.

The thermodynamic principles governing the adsorption involve enthalpy and entropic terms that either favor or resist adsorption:

$$\Delta_{ads}G = \Delta_{ads}H - T\Delta_{ads}S < 0 \quad (1)$$

G, H, S and T stand for the Gibbs energy, enthalpy, entropy and temperature of the system, while $\Delta_{ads}$ indicates the change in thermodynamic functions of state resulting from the adsorption process. Enthalpy involves intermolecular forces such as van der Waals forces, Coulomb forces, Lewis acid-base forces whereas entropy is based on hydrophobic interactions, conformational entropy and restricted mobility. Adsorption will occur when the change in Gibbs (G) energy becomes negative and there is a net result between attracting and repulsive interactions between material surface, adsorbed molecules and solvent.

Known bitter tasting compounds contained in food and beverage products are naringin, tangeretin, nobiletin, sinensetin, quercetin, catechin, epicatechin, epicatechin gallate, epigallocatechin, epigallocatechin gallate, catechin mono and polymers, limonin, nomilin, sinigrin, progoitrin, glucobrassicin, 5-hydroxymethylfurfural, furfuryl acid, trigonelline, chlorogenic acid, caffeic acid, citric acid, malic acid, lactic acid, pyruvic acid, acetic acid, pyrazine, 5-O-caffeoyl- and 5-O-feruloylquinic acid, 3-O-caffeoyl-γ-quinide, 4-O-caffeoyl-γ-quinide, 5-O-caffeoylepi-8-quinide, 4-O-caffeoyl-muco-γ-quinide, 5-O-caffeoyl-muco-γ-quinide, 3-O-feruloyl-γ-quinide, and 4-O-feruloyl-γ-quinide, 3,4-O-dicaffeoyl-γ-quinide, 3,5-O-dicaffeoyl-epi-8-quinide, and 4,5-O-dicaffeoyl-mucoγ-quinide, chlorophyll, phenylalanine, myricetin-3-galactoside, myricetin-3-glucoside, quercetin-3-glucosyl-rhamnosyl-galactoside, quercetin-3-glucosyl-rhamnosyl-glucoside, kaempferol-3-glucosyl-rhamnosyl-galactoside and kaempferol-3-glucosyl-rhamnosyl-glucoside, Pentagalloylglucose, malvidin-3-glucoside, procyanidin dimer (catechin-(4-8)-catechin, and trimer (catechin-(4-8)-catechin (4-8)-catechin), Methylxanthines, caffeine, Theobromine, flavonol-3-glycosides, quinizolate, homoquinizolate and other compounds.

Bitter taste seems related to the hydrophobicity of the compound. Human taste receptors for bitter taste seem selective towards bitter tasting compounds that are hydrophobic compounds (Bitterness: Perception, Chemistry, and Food Processing)

Congeners (which is from the Latin meaning born together) are all the other compounds in an alcoholic beverage other than the water and ethyl alcohol that assist in the distinctive aroma, flavor, and appearance of the beverage. There are many different types of congeners that are produced in the fermentation and aging of the various alcoholic beverages. Typical congeners found in different types of alcoholic beverages such as beer, wine, and spirits are methanol, isopropanol, 1-propanol, 2-methyl propan-1-ol, 2-butanol, isobutanol, 1-butanol, 2-methyl-1-butanol, 3-methyl-1-butanol (isoamyl alcohol), n-pentanol (n-amyl alcohol), 2-pentanol, phenylethyl alcohol, cis-3-hexene-1-ol, 4-vinyl guaiacol, 4-methyl guaiacol, 4-ethyl guaiacol, guaiacol, heptanol, octanol, decanol, 1-hexanol, furfuryl alcohol, benzyl alcohol, butanediol, ethyl acetate, ethyl syringate, 4-ethyl phenol, acetaldehyde, ethyl vinyl ether, diethyl ether, 1,1 diethyloxyethane, isoamyl acetate, styrene, 2-pentylfuran, ethyl hexanoate, ethyl octanoate, ethyl deconoate, 2-phenylethanol, ethyl formate, n-ethyl dodecanoate, butyl formate, ethyl butyrate, ethyl caprylate, ethyl hexanoate, furfuryl hexanoate, ethyl propanoate, ethyl lactate, ethyl caprate, ethyl decanoate, diethyl succinate, diethyl malonate, propionaldehyde, isobutyraldehyde, 2-methylbutyraldehyde, 3-methylbutyraldehyde, butenal, octanal, decanal, furfural, 5-methyl-2-furfual, syringaldehyde, hexanal, 2-nonenal, benzaldehyde, diacetyl, 4-vinyl guaiacol, cresol, vanillin, acetic acid, octanoic acid, decanoic acid, 2-decanoic acid, dodecanoic acid, formic acid, palmitic acid, palmitoleic acid, propionic acid, 2-methylpropionic acid, butyric acid, 3-methylbutyric acid, hexanoic acid, pentanoic acid, butanoic acid, nonanoic acid, other straight chain monocarboxylic acids, acetone, 2,3-butanedione, 2,3-pentanedione, 2-pentanone, whiskey lactone (4 stereoisomers), acetovanillione, glycerol, thiomenthone, sodium bisulfite, 3-methyl-2-butene-1-thiol, methoxypyrazine, 1,1-diethoxy-2-methyl propane, 2-octen-2-one, heptadecane, 2-propyl-1-pentene, 1,1-diethoxy-ethane, 2-pentyl furan, D-limonene, beta linalool, dodenoic ethyl ester, pyrazines, and other compounds. Some of the congeners provide a pleasant flavor to the liquor while others can be objectionable like ethyl acetate, cresol, styrene which in high enough concentrations provides an unpleasant chemical solvent like flavor. Treatment of the alcoholic beverage with this invention results in a smoother taste which is characteristic of a beverage that has been aged for a long period of time to improve its flavor using techniques known in the art such as aging in oak barrels. One of the improvements the consumer experiences is less burning sensation less irritation in the mouth and throat when consuming spirits treated with the polypropylene adsorbent along with a reduced chemical taste providing for a more enjoyable experience.

The polypropylene homopolymers and most copolymers have a density less than 1 which allows them to float in aqueous solutions. Without being bound by this theory, it seems this property provides an advantage for the operation of wand and other devices containing the polypropylene polymers and/or copolymers by allowing the polymer particles to move and shift around to aid the flow-through properties of the resin beds employed in the various embodiments of the devices providing a more efficient operation of the adsorbent devices.

When polypropylene film is extruded and stretched in both the machine direction and across machine direction it is called biaxially oriented polypropylene. Biaxial orientation increases strength and clarity. BOPP is widely used as a packaging material for packaging products such as snack foods, fresh produce and confectionery. It is easy to coat, print and laminate to give the required appearance and properties for use as a packaging material. This process is normally called converting. It is normally produced in large rolls which are slit on slitting machines into smaller rolls for use on packaging machines.

The present technology is performed by having the adsorbent polymer present in the beverage either during its brewing in a closed environment (e.g., tea pot, coffee brewer, cup and the like), during its transport after brewing to the beverage container (e.g., tubes, pipes, spigot, flask, etc.) or in the final container from which the drinker imbibes the beverage without further brewing (e.g., cup, bottle, flask, glass, etc.). Contact with the liquid may be provided with a solid or porous sheet of the polymer, a bed of particles of fibers, a polymer fabric, or a fabric containing strips or fibers of the polymer.

The liquid with at least some of the brewed beverage must be contacted with the surface of the polymer. This can be done while the beverage is being brewed by having the polymer in the brewing environment (as a sheet, as a fabric, as an implement placed within the liquid, or as a lining on the walls of the brewing apparatus). In the transport mode, the liner of the carrier may have strips or a lining thereon, there may be filters of the polymer across the transport diameter, or the flow path may have multiple cannula made of the polymer. It appears to be easiest to treat the final beverage in the final serving (pot, kettle, flask, decanter, bottle, pitcher) element by stewing the polymer element or material for a modest time within serving device. When bottled beverages are prepared, the brewed beverage may have a longer dwell time with the polymer before being bottled.

With beverages to be served hot, the dwell time will tend to be shorter, such as two minutes or less so that the beverage does not cool down (unless in an insulated container, where longer dwell times may occur). Longer dwell times in an open beverage container may be used at the sacrifice of some warmth in the beverage. The beverage could be heated again, but this in itself may cause some level of bitterness, especially where European breed with leaves or beans remaining in the beverage after initial brewing.

It is clear to any organic chemistry, physical chemistry and fluid dynamics analysis that the rate and degree of bitterness-producing chemical removal from the beverages must be related to the contact surface area, the length of time of contact between the surface and the beverage, flow rate over the contacting surface, degree of attraction between the surface and the bitterness-providing chemicals in the beverage and other physical factors that may be influenced by temperature and pressure.

The Following Tests are Used to Define the Terms "Oleophilic-Adsorbing Polyolefin" and "Hydrophobic-Adsorbing Polyolefin"

The candidate adsorbent resin (for either hydrophobic-adsorbing or oleophilic-adsorbing resins) was used in the identical manner performed in the following example.

The actual test was performed using a polypropylene homopolymer-Flint Hills Resources PP HP P4G2T077D NAT. 6.0 grams of the Flint Hills resin. The resin was in the form of beads with a typical average diameter of ⅛" or 3 mm. This dimension is typical—the actual Flint Hills beads used in the experiment were pelletized in the form of an elliptical cross section with an average long axis=0.1748", average short axis=0.1491", average surface area per pellet=0.213 square inches, average surface area in 6 grams of these beds 62.8 sq in-were placed in a SS (stainless steel) commercially available Mesh Tea Infuser. The use of pellets with average surfaces areas per pellet of 0.2-0.3 square inches to be used in the test. This 6.0 grams is the amount of resin (of either oleophilic-adsorbing and/or hydrophobic-adsorbing olefinic resin) the inventors have been using in current non-commercial prototypes. The loaded infuser was taken and placed in a 200 ml beaker containing a saturated 1-heptanol solution of 200 ml of about 0.0158 moles/Liter (at 20 C and 760 mm pressure) 1-heptenol solution with water as the solvent and the loaded infuser stirred around in the saturated 1-Heptanol aqueous solution for 1 minute. The infuser+resin+retained solution were weighed periodically over the course of the next 10 hours, recording the weight loss as the solution evaporated out of the resin bed. One of the challenges was as the resin dried both water and 1-heptanol were evaporating. 2 separate experiments were run where a separate small amount of 1-heptanol solution was placed in a weighing dish under the same environmental conditions (20 C and 1 atmosphere of pressure), with the exposed surface area of 1.48 square inches and the weight loss recorded with time. This was accomplished by putting 0.0423 grams of 1-heptanol in a weighing dish and leaving it exposed to ambient conditions and periodically measured the weight loss with time. A second experiment was done where the 6 grams of resin in the infuser was stirred in distilled water for 1 minute and allowed to dry at ambient conditions.

It was found that in the time it took the water to completely dry out of the infuser, the 1-heptanol had lost 39% of its weight. This relationship was used to estimate the point at which all the water had dried out of the infuser (the weight at 315 minutes was used as this point)—the difference in weight of the dry infuser and the weight at 315 minutes was taken as the weight of the 1-heptanol remaining at 315 minutes. It was reasonably assumed this was 61% of the original weight of 1-heptanol adsorbed out of the saturated solution. In 2 different measurements, it was found that in 1 minute-infuser 1 adsorbed 79% of the dissolved 1-heptanol and infuser 3 adsorbed 65% of the available 1-heptanol. These numbers seem consistent with what was experienced when using the infuser prototypes—the beverage is typically treated for less than 1 minute with a prototype and a significant difference in taste is experienced. The actual numbers of 1-heptanol worked with are 0.368 grams of 1-heptanol was dissolved in the distilled water to begin with, infuser 1 adsorbed 0.2900 grams of 1-heptanol, infuser 3 adsorbed 0.2389 grams of 1-heptanol. 1-heptanol is listed as a hydrophobic material in the literature.

Any polyolefin (polymer or copolymer) used under these rigorously defined test conditions which adsorbs at least 10% or even at least 15% or at least 25% (in a narrower definition) by weight adsorbing olefinic resin of the 1-Heptanol from the solution in one minute is defined as a hydrophobic-adsorbing olefinic resin.

Correspondingly, using oleic acid in the test for an oleophilic-adsorbing polyolefin resin and adsorbs 10% by weight of that other standard oleophilic material from the solution, suspension or dispersion (by continuous stirring) in water is defined as an oleophilic-adsorbing resin.

The test compound chosen for the hydrophobic compound test was 1-heptanol. A paper showed that measurements have been made on the solubility of 1-heptanol in water using a GC (gas chromatography) technique (Mutual Solubility of Water and Aliphatic Alcohols, Richard Stephenson, James Stuart, Mary Tabak, Journal of Chemical and Engineering Data, Vol 29, No 3, 1984, P. 289). Solubility at 20° C. was 1.84 gm/L. This gives a solution with a molarity of 0.0158 Molar at 20° C. and 1 standard atmosphere.

A mesh infuser (tea caddy) was used to hold the Flint Hills Resources polypropylene homopolymer (this device is used to normally hold tea leaves to brew a cup of tea). Two different measurements were made using two different infusers each containing 6.00 gm of the polypropylene homopolymer. Two (2) different drying times were used with just distilled water to measure the drying rate of water and 1-heptanol to measure its drying rate from the infuser/resin. It was determined that the water was dried off at 315 minutes at room temperature. At 315 minutes the polypropylene homopolymer retained 0.0034 gm. of weight (probably water contained in the polypropylene-all plastics will absorb some water). This amount was added back into the measurements to account for this part of the total weight measured. The drying rate was re-measured for the 1-heptanol by using a mesh infuser with 6.0 gm of polypropylene homopolymer. Results using this technique reduced the amount of 1-heptanol that dried off in the 315 minutes as compared to a flat weighing dish with an exposed surface area of 1.48 square inches. At 315 minutes 89.82% of the 1-heptanol remained. This value was used to adjust the final weight measured to account for the 1-heptanol that evaporated in the 315 minutes.

The results obtained for the two different infusers loaded with 6.0 gm of homopolymer and mixed in the 0.0158 Molar 1-heptanol solution in water for 1 minute were:

Infuser 1 adsorbed 53% of the 1-heptanol in solution in 1 minute of mixing.

Infuser 2 adsorbed 43% of the 1-heptanol in solution in 1 minute of mixing.

An appropriate definition for hydrophilic-adsorbing materials should therefore be set a minimum limit of 10% adsorption on the hydrophilic-adsorbing target resin for the compound to absorb to be considered hydrophobic in this defining test. Alternatively, this is a format for a defining test for hydrophobicity.

For oleophlicity-adsorbency or olelophilic-adsorbency, two different oils were used initially, mineral oil and canola oil. Again, a mesh infuser (tea caddy) loaded with 6.00 grams of the Flint Hills polypropylene homopolymer. For the mineral oil 0.6824 grams of the oil was placed in 200 ml of distilled water. This oil is essentially insoluble in water so it just floated on the surface. The infuser/resin was placed into the oil/water mixture and stirred around for 1 minute. Results of this test showed that 86% of the oil was adsorbed by the polypropylene homopolymer. In the second test with canola oil, 0.9094 grams of Wesson canola oil was added to 200 ml of distilled water-again it floated on the surface because it has little significant solubility in water. I again stirred the Infuser/resin in the oil and water mixture for 1 minute. Results of this test gave 53% of the oil adsorbed. Both of these oils are mixtures of materials.

This test could alternatively be used with just the Oleic Acid. In this test, 0.8552 grams of oleic acid was added to 200 ml of distilled water. The oil had little significant solubility in water and floated on the surface. A mesh infuser loaded with 6.0124 gms of Flint Hills Resources polypropylene homopolymer was stirred in the water/oil mixture for 1 minute. The infuser was withdrawn from the water/oil mixture and allowed to dry with weighings taken periodically until no additional weight loss was recorded indicating the water had dried off. Comparing the final weight to the dry weight of the infuser+resin 81% of the initial oleic acid was adsorbed by the polypropylene resin.

There is an ASTM test for the performance of an adsorbent-ASTM-F726-12, which is incorporated herein in its entirety by reference. Alternatively, this test could be used in our patent as the test for oleophilicity, or oleophilic-adsorbing polyolefin. It is a standard test for adsorbing oils from water.

These tests define the properties of oleophilic-adsorbing and hydrophobic-adsorbing polyolefins.

It can be broadly estimated that the process of hydrophobic adsorption for removal of the bitterness-causing chemicals is highly relevant to the relative surface area of the polypropylene adsorptive surface(s) and the volume of the beverage. High surface area materials (beads in a bed) and reticulated structures with open pores are more efficient structures for high efficiency removal. It is believed that films of polypropylene layered with flow volumes between them can provide at least intermediate levels of contact and intermediate levels of speed and efficiency of removal. It is theorized that a range beginning with at least a minimally effective ratio of +0.001 square meter of surface area of polypropylene to 0.20 liters of beverage with a contact time of at least 5 seconds with disrupted (not laminar) flow cross the surface. More highly efficient relations that may be used can be expected to be as high as 10 square meters of surface area for 0.1 liters of beverage for 10 seconds. In other terms, with 0.1 millimeters diameter beads of specific gravity between 0.85-1.5, the weight ratio of beads to liquid during contact may be as low as 0.005/1.0 and as high as 50:1. These ranges are reasoned estimates, but may vary by significant amounts of even multiples of the end ranges identified. With these higher surface areas of contact and sufficient volume of contact area, flow rates similar to those through a Brita® filter, which can be at volumetric rates on a small home scale of between a pint/minute and a quart/minute. Larger scale designs would have flow limits determined only by scale.

The surfaces may be smooth, linear, curved, striated, etched or porous.

The absorbent/adsorbent that has been found to provide the benefit of the removal of bitter, sour, acidic and other off tastes is a polyolefin bead. The preferred polyolefin is polypropylene homopolymer but polypropylene copolymers, low density polyethylene, high density polyethylene, linear low density polyethylene, polybutylenes, polybutene-EPDM resins, cyclic olefins polymers (COP) like polynorbornene, cyclic olefin copolymers like those made by Topas Advanced Polymers are also useful in this invention. The absorbent/adsorbent can consist of just the polyolefin or blends of or copolymers of the polyolefins. The absorbent/adsorbent can be in different forms. A bead shape roughly spherical is preferred but can also be in any other shape encountered in a pelletizing operation such as rod shaped, flat ovals, and other shapes, as fibers, micro-replicated surface, porous beads, porous monoliths, porous membrane. A typical pelletized bead diameter is 3 mm. this size provides enough surface area for this application but also has good flow through of the liquid beverages. A smaller bead size would increase surface area but would also start to restrict the rapid flow through the absorption/adsorption bed. As the flow became restricted it would take longer for the beverage to flow past and contact the beads of the absorbent/adsorbent.

A fiber shape for the absorbent/adsorbent would provide greater surface area but because of its hydrophobic surface it is more difficult to wet the fibers. As a point of reference, it has been found that fibers with a cross sectional open area of about 0.0001 sqin between the fibers do not allow water to flow between the fibers. The surface tension of water causes the water to bead-up on the surface of the fibers and run off without passing between the fibers. Fibers with a cross sectional open area between them of about 0.0003 sqin is sufficient opening to allow the water to adsorb into the fibers and pass through the fibers. Polypropylene blown microfiber is difficult to wet out with water and would need some sort of treatment to improve the wettability of the fiber but could affect the effectiveness in removing the bitter off tasting compounds from the desired beverage.

Beads of polypropylene are produced in a pelletizing process well known to those skilled in the art. Pelletizing under water makes a more spherical shaped polymer bead. This process is described in U.S. Pat. Nos. 4,300,877 and 4,461,737 incorporated here as reference. Porous beads can be made by a variety of processes. Mixing the polypropylene melt with a porogen material like mineral oil which is miscible at melt temperatures but phase separates as the melt is cooled forming an interconnected porous structure. It is necessary to remove the mineral oil to leave the desired porous structure. Supercritical $CO_2$ could potentially be used to create porous open cell particles if the proper processing conditions were used. A surface roughness on the solid polymer bead can be produced for increasing surface area by coating the bead with a solution of dissolved polypropylene (in hot xylene for example) by known techniques and then drying the solvent to leave behind a roughened surface of greater surface area. Other chemical and mechanical treatment techniques are possible.

DESCRIPTION OF THE DRAWINGS

Figure 2:
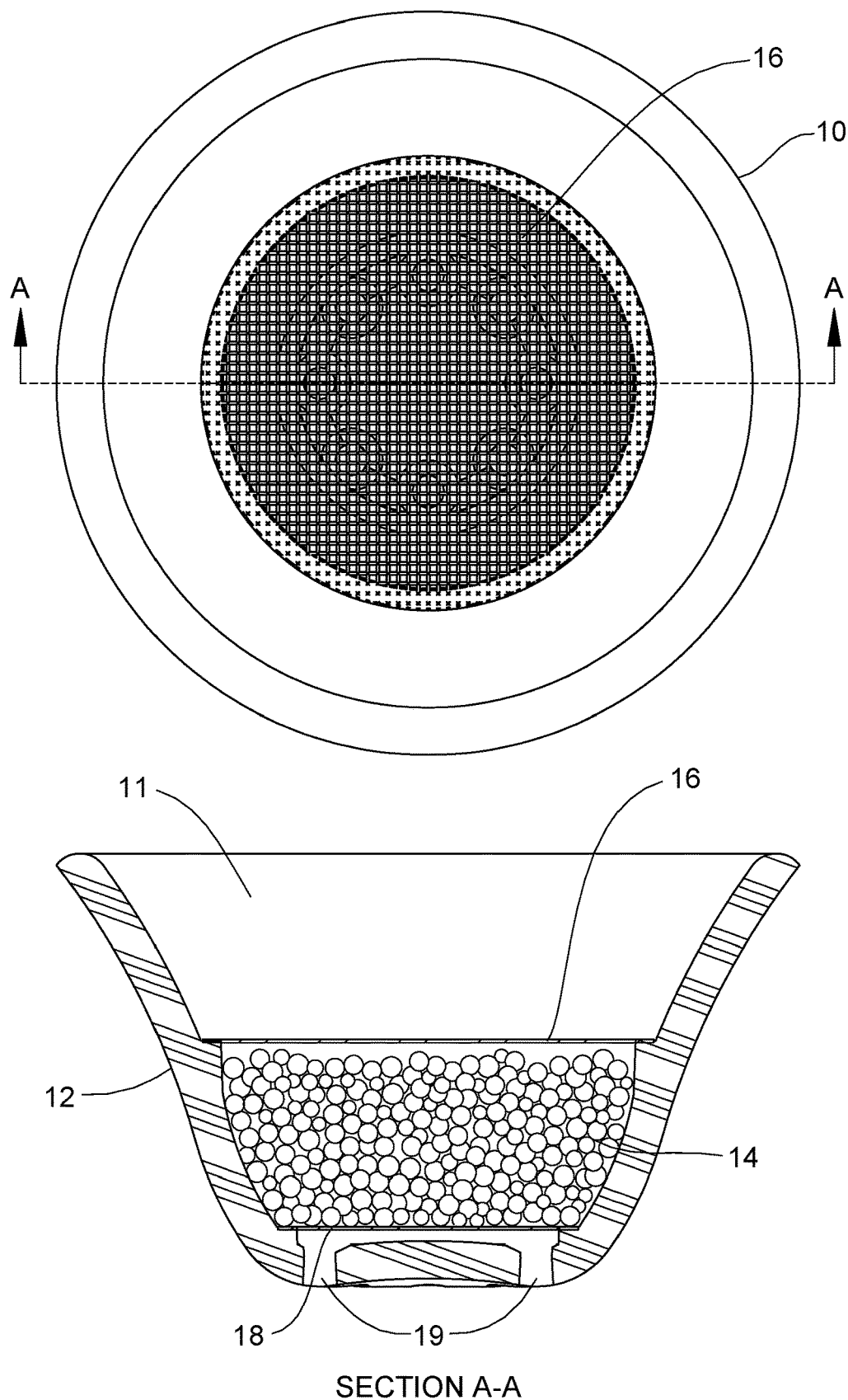
FIG. 2 shows a cross-sectional view of the flow through device for treating a glass of wine with the adsorbent in bead form.
Figure 3:
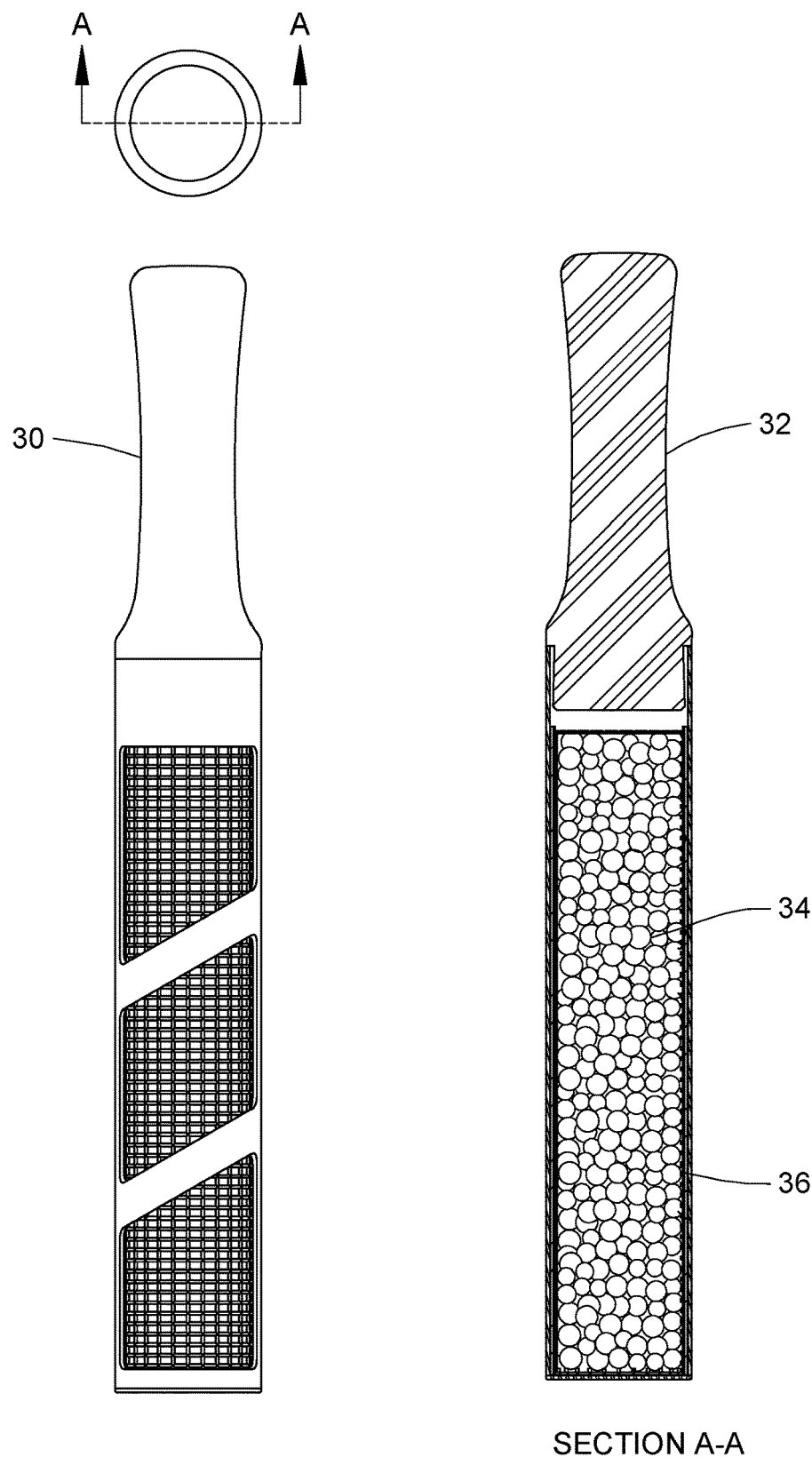
FIG. 3 shows a frontal view and cross-sectional view of a wand type device for stirring in a cup of coffee, cup of tea, or glass of fruit juice with the absorbent in bead form.
Figure 4:
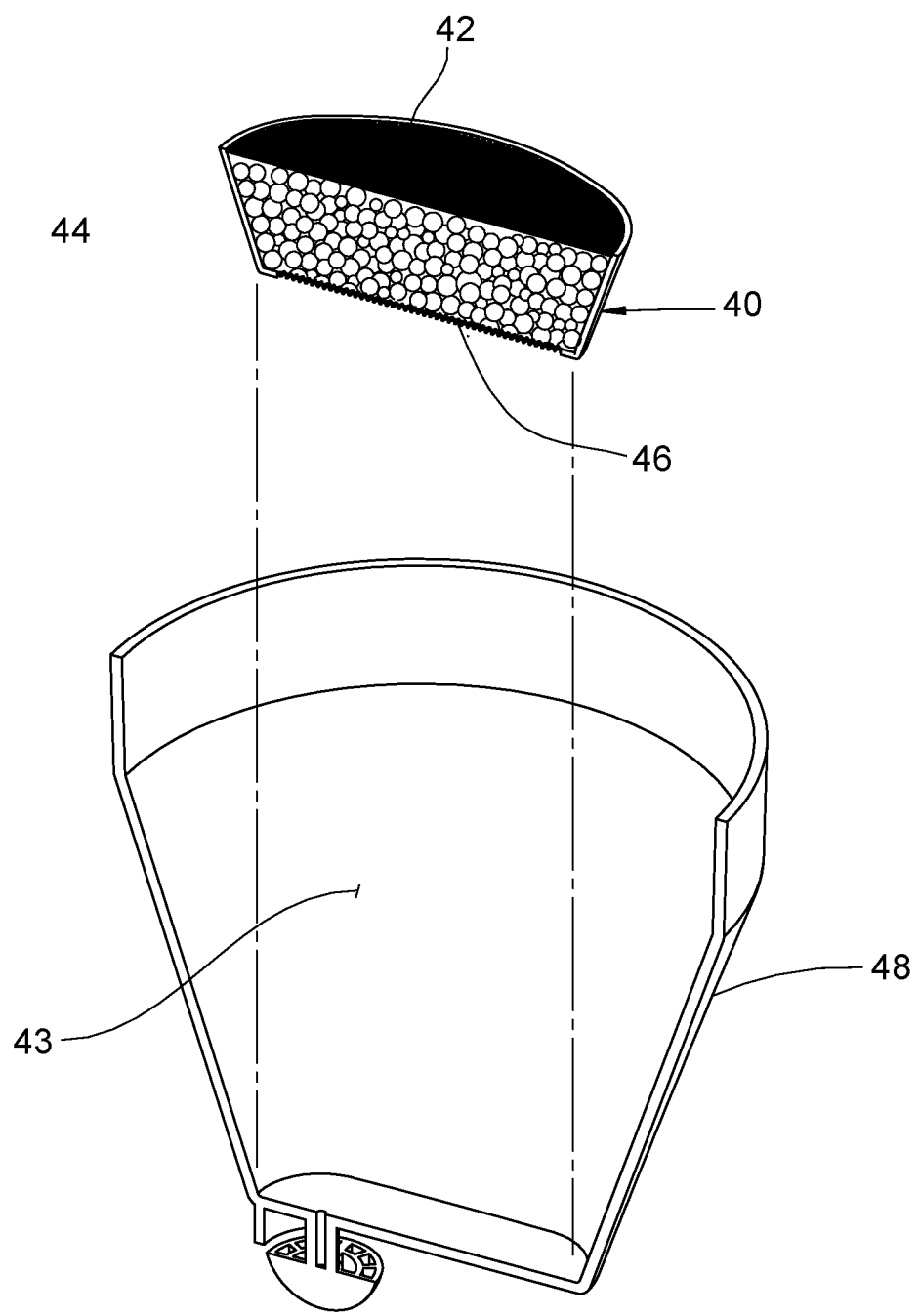
FIG. 4 shows a cross-sectional view of an absorbent resin bed built into a filter holder for a coffee maker like the Cuisinart model DCC-3850.
Figure 5:
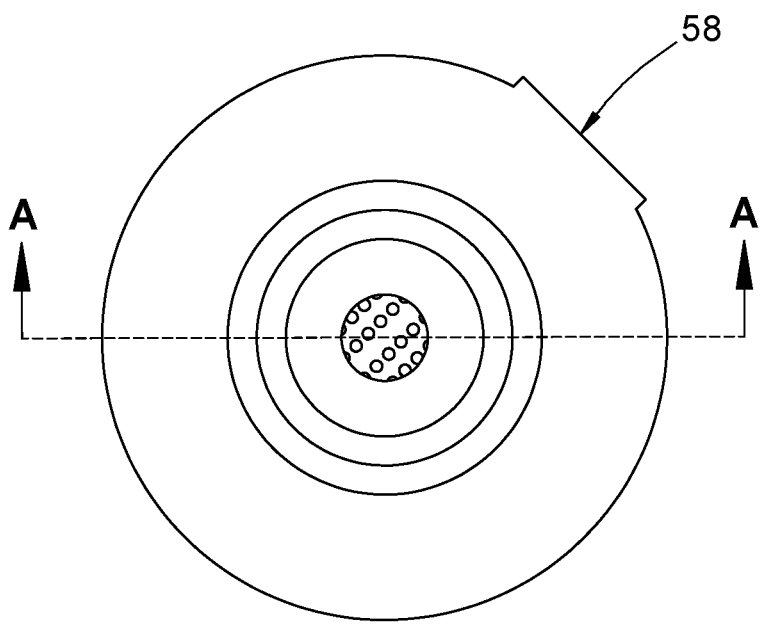
FIG. 5 shows a K-cup type container designed to contain an absorbent/adsorbent resin bed for removing unpleasant tastes from a beverage in an automatic beverage maker like the Keurig coffee maker.
Figure 5:
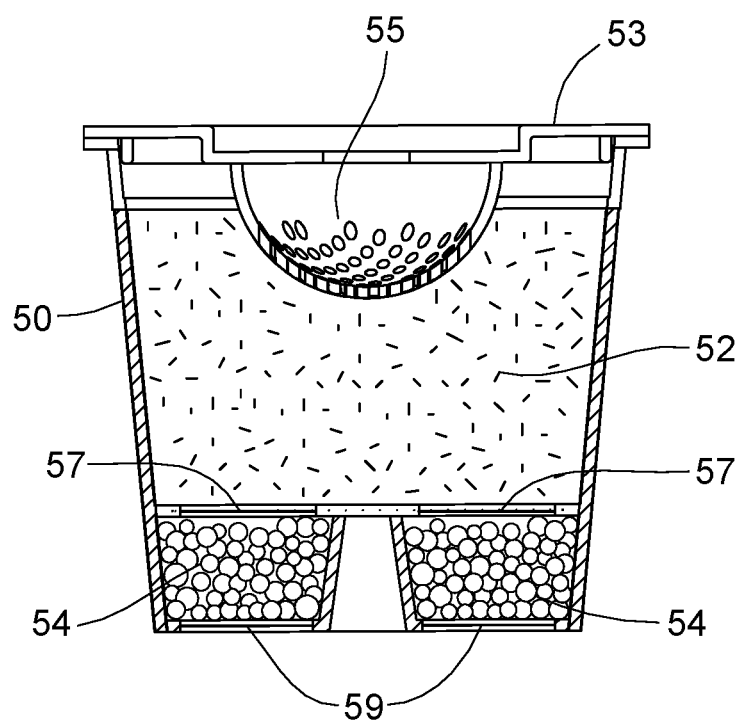

FIG. 1 is an illustration of a (10) flow through version of the treatment device as it would sit on top of a glass (20) to receive a beverage like wine. FIG. 2 shows a top view of the flow through device and a cross sectional view. The housing (12) of the device contains an input reservoir (11) for containing a volume of the beverage as it enters the device. Screen mesh (16) is porous and allows the liquid beverage to flow through it into the area containing the absorbent/adsorbent pellets (14). A bottom screen mesh (18) keeps the absorbent/adsorbent pellets from falling out of the device and also from plugging the outlet holes (19) that permit the liquid beverage to exit the device. FIG. 3 illustrates another embodiment of the treatment device. It is a wand (30) with a handle (32) for gripping and allowing the user to stir the device in a container of the beverage for treatment. Absorbent/adsorbent resin (34) is contained in the body of the device surrounded by a porous screen 36 which allows the liquid to flow into and through the bed of absorbent/adsorbent resin (34). FIG. 4 shows the coffee filter area on an automatic coffee machine like the Cuisinart model DCC-3850. An absorbent/adsorbent cartridge (40) is designed to sit in the bottom of the coffee ground filter area (43). The cartridge has an inlet porous screen (42) to allow hot water to flow from the coffee grounds area (43) into the absorbent/adsorbent cartridge (40). The coffee brew enters the absorbent/adsorbent cartridge (40) and passes through the absorbent/adsorbent resin bed (44) where the undesirable tastes are removed. The coffee brew then exists the absorbent/adsorbent cartridge through porous screen (46) and into a suitable receiver like a coffee mug or cup. FIG. 5 shows a reusable Keurig type coffee or other beverage cartridge (50). The top of the cartridge (53) can be opened with hinge attachment (58). Coffee or other beverage ingredients (52) is contained below the top—a porous mesh (55) allows for hot water to enter the beverage content area (52). The coffee brew enters the absorbent/adsorbent resin bed (54) by flowing through porous inlet screen (57) where the brew can contact the resin (54). The brew is able to exit the resin bed area by flowing through porous exit screen (59).

Figure 6:
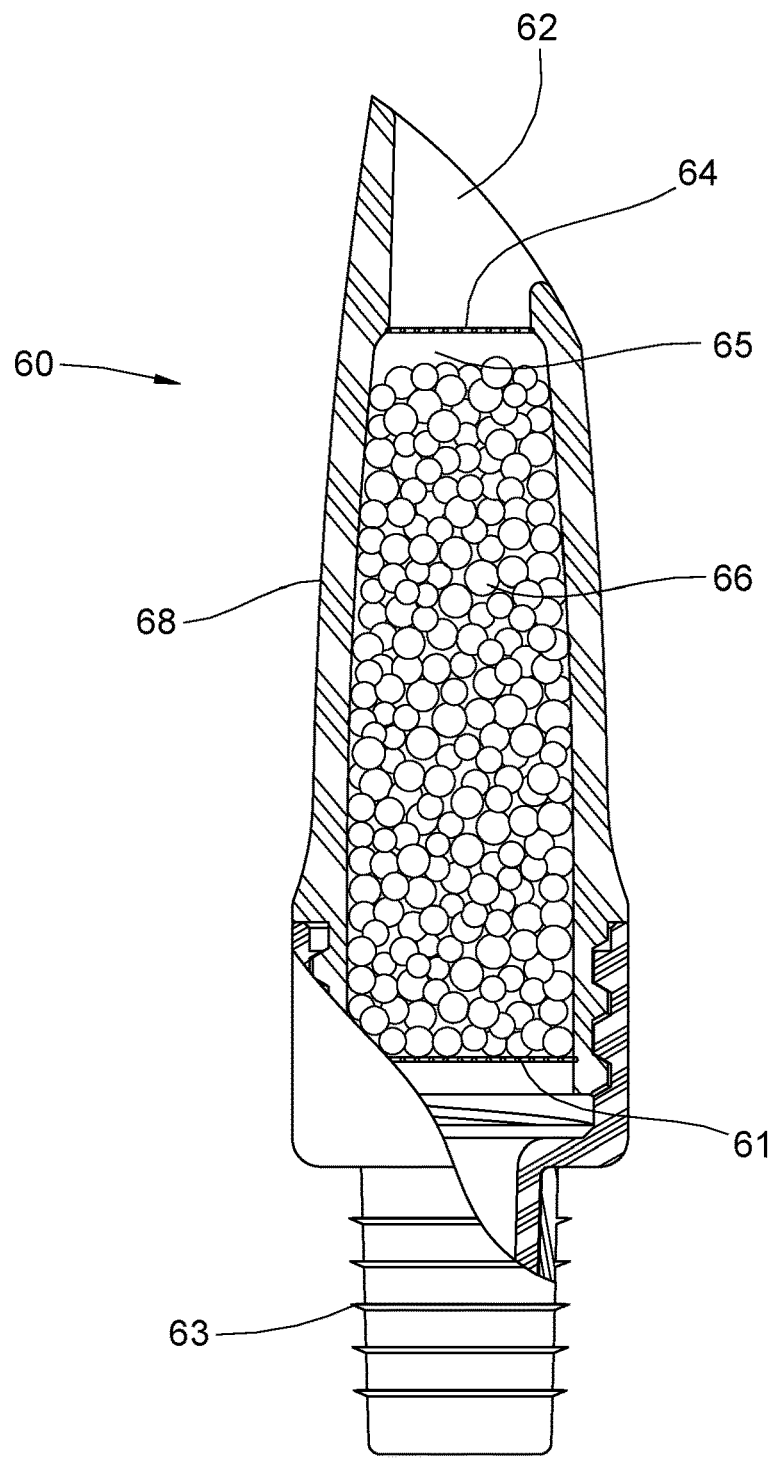
FIG. 6 shows a partial cross-sectional view of a pour through device containing an adsorbent resin bed constructed to attach to a bottle containing a beverage to be treated that allows the beverage to flow through the adsorbent bed and out into a suitable receiver like a glass once the bottle is tipped up.

FIG. 6 illustrates a pour through device adapted for attaching to a bottle containing a beverage. The pour through device (60) containing a bed of adsorbent (66) contains a base constructed with concentric elastomeric sealing rings (63) for sealing the device into the neck of a beverage bottle. As the bottle is tipped up, the beverage flows out of the bottle and through the inlet screen mesh (61) and into the adsorbent resin bed (66). The beverage flows through the adsorbent bed (66) and out of the outlet screen mesh (64) and then out the pour spout (62) into a suitable receiver such as a glass. The resin bed (66) is constructed with a void area (65) that allows a better flow through the resin bed by allowing the resin particles to move a little as the beverage flows through the resin bed. The adsorbent is contained in a housing (68) which holds all the components in the proper position. These illustrations are examples of embodiments of the invention and are not meant to be limiting. Other configurations will be apparent to those skilled in the art.

Other embodiments of the invention are possible without departing from the intent of the invention to expose a liquid beverage or food to the absorbent/adsorbent resin and remove the undesired bitter or off tasting components.

Example 1

A cup of tea was brewed in a 250 ml container using a tea bag of Tetley British Blend tea using water at 212° F. after brewing the tea was split between two containers. One container of the tea was treated with a treatment device containing the polypropylene absorbent/adsorbent resin similar to the one shown in FIG. 3. The treatment device was stirred in one of the containers of tea for several seconds after the tea had cooled to 130° F. A film of oil could be seen on the top surface of the tea. After treatment the film of oil was gone. Tasting the untreated container of tea gave a distinctive bitter taste and after taste to the tea. Tasting the container of tea that had been treated with the wand shaped device had no bitter taste.

Example 2

A cup of tea was brewed in a 250 ml container using a tea bag of Tetley British Blend tea using water at 212° F. after brewing the tea was split between two containers. One container of the tea was treated with a treatment device containing the polypropylene absorbent/adsorbent resin similar to the one shown in FIG. 3. The treatment device was stirred in one of the containers of tea for several seconds while the tea was still at a higher temperature of 190° F. The tea was allowed to cool to below 160° F.—the temperature at which the surface film of oil was seen to develop on the surface of the tea. Surface oil was seen in the untreated cup of tea but no oil film was seen in the treated cup. Tasting the untreated cup of tea gave a bitter taste and after taste to the tea. Tasting the treated cup of tea no bitter taste or after taste was noticed.

Example 3

A cup of tea was brewed in a 250 ml container using a tea bag of Tetley British Blend tea using water at 212° F. after brewing the tea was split between two containers. One container of the tea was treated with a treatment device containing Delrin polyacetal absorbent/adsorbent resin similar to the one shown in FIG. 3. The treatment device was stirred in one of the containers of tea for several seconds when the tea had cooled to 130 deg F. The surface oils which had formed on the tea were removed by treatment of the tea by the acetal resin. Tasting the untreated cup of tea revealed a bitter taste and after taste. Tasting the cup of tea treated with the acetal resin also had a bitter taste and after taste showing that the acetal resin while removing the surface oils on the tea surface did not remove the bitter flavor contained in the tea.

Example 4

Coffee was brewed using Cameron's Kona blend coffee using a Cuisinart programmable coffee maker using water at 212° F. After brewing the coffee was split into two different cups. One cup was treated with the wand type device containing a polypropylene resin absorbent/adsorbent by stirring the wand in the coffee for several seconds and the other cup was left untreated. The untreated cup had a noticeable bitter taste and after taste that was recorded. The treated cup did not display any bitter taste or after taste.

Example 5

A flavored coffee called hazelnut blend was brewed using the Cuisinart programmable coffee maker with water at 212° F. After brewing, the coffee was split into two different cups. One cup was treated with the wand type device containing a polypropylene resin absorbent/adsorbent by stirring the wand in the coffee for several seconds and the other cup was left untreated. The untreated cup had a noticeable bitter taste and after taste that was recorded. The treated cup did not display any bitter taste or after taste. This difference in taste was noticeable even though a hazelnut flavor enhancer had been used with the coffee.

Example 6

A bottle of Tropicana orange juice was opened and left partially empty (about 25% of the orange juice was left in the bottle) in the refrigerator for several days. A test panel was given two different glasses of orange juice from the contents of this opened bottle. One glass was left untreated and the second glass was treated with the wand type device containing a polypropylene resin absorbent/adsorbent by stirring the wand in the orange juice for a few seconds. The untreated glass had a distinct tartness taste and after taste. The treated sample lacked the tartness of the untreated glass and had a smoother more pleasant taste to it.

Example 7

A bottle of Great Value Country Style orange juice with pulp was opened and left partially empty (about 25% of the orange juice was left in the bottle) in the refrigerator for several days. A test panel was given two different glasses of orange juice from the contents of this opened bottle. One glass was left untreated and the second glass was treated with the wand type device containing a polypropylene resin absorbent/adsorbent by stirring the wand in the orange juice for a few seconds. The untreated glass had a distinct bitter and tart taste and after taste. The treated sample lacked the bitterness and tartness of the untreated glass and had a smoother more pleasant taste to it. The pulp did not interfere with the operation of the wand absorbent/adsorbent device.

Example 8

A bottle of Arnold Parmer tea and lemonade beverage was opened and two different glasses were poured. A test panel tasted the two different glasses of tea/lemonade mix after one glass was left untreated and the second glass was treated with the wand type device containing a polypropylene resin absorbent/adsorbent by stirring the wand in the Arnold Palmer tea/lemonade beverage for a few seconds. The untreated glass had a distinct bitter and sour taste and after taste. The treated sample lacked the bitter and sour taste of the untreated glass and had a smoother more pleasant taste to it.

Example 9

A container of Vita Coco beverage was opened and two glasses were poured for tasting. One glass was left untreated and the second glass was treated with the wand type device containing a polypropylene resin absorbent/adsorbent by stirring the wand in the Vita Coco beverage for a few seconds. The untreated glass had a noticeable aftertaste that was unpleasant, the treated glass did not have an unpleasant after taste.

Example 10

A cup of hot chocolate was made using Equal Exchange Fair Trade Dark Chocolate Hot Chocolate mix using 6 oz of hot fat free milk. After mixing the Powdered chocolate mix into the hot milk, the hot chocolate beverage was split between two different cups. One cup was left untreated while the other cup was treated with a device similar to the wand containing a polypropylene resin absorbent/adsorbent by stirring the wand in the hot chocolate beverage for a few seconds. The untreated cup of hot chocolate had a distinctive bitter after taste while the treated cup had the rich flavor of dark chocolate but had no bitter after taste. In fact, the very pleasant aftertaste lingered for quite a while after drinking the hot chocolate and added to the enjoyment of drinking the hot chocolate beverage.

Example 11

A bottle of Tampico Orange Tangerine Citrus Punch was opened and poured into two different glasses. A test panel was given two different glasses of juice from the contents of this bottle. One glass was left untreated and the second glass was treated with the wand type device containing a polypropylene resin absorbent/adsorbent by stirring the wand in the tangerine juice for a few seconds. The untreated glass had bitter, sour, and sweet taste. The treated sample lacked the bitterness of the untreated glass but retained the sour and sweet taste. There was also no bitter aftertaste with the treated glass of juice.

Example 12

A bottle of Great Value Cold Brew Vanilla Latte Coffee drink was opened and poured into two different glasses. One glass was left untreated and the second glass was treated with the wand type device containing a polypropylene resin absorbent/adsorbent by stirring the wand in the Latte drink for a few seconds. The untreated glass had a distinct bitter taste and aftertaste. The treated sample lacked the bitter taste and aftertaste and had a smoother more pleasant more enjoyable taste to it.

Example 13

A container of cold Starbucks Brown Butter Frappuccino was opened and poured into two different glasses. One glass was left untreated and the second glass was treated with the wand type device containing a polypropylene resin absorbent/adsorbent by stirring the wand in the Frappuccino for a few seconds. The untreated glass had a distinct bitter aftertaste. The treated sample lacked the bitter aftertaste of the untreated glass and had a smoother more pleasant taste to it.

Example 14

A bottle of Pure Leaf iced tea was opened and poured into two different glasses. One glass was left untreated and the second glass was treated with the wand type device containing a polypropylene resin absorbent/adsorbent by stirring the wand in the iced tea for a few seconds. The untreated glass had a very bitter taste and after taste. The treated sample had no bitter taste or aftertaste and had a smoother more pleasant taste to it.

Example 15

A bottle of Snapple Mango Tea was opened and poured into two different glasses. One glass was left untreated and the second glass was treated with the wand type device containing a polypropylene resin absorbent/adsorbent by stirring the wand in the Mango Tea for a few seconds. The untreated glass had a distinct bitter, sour, and sweet taste and aftertaste. The treated sample lacked the bitter and sour taste of the untreated glass.

Example 16

A can of Monster Energy drink was opened and a test panel was given two different glasses of Monster Energy Drink. One glass was left untreated and the second glass was treated with the wand type device containing a polypropylene resin absorbent/adsorbent by stirring the wand in the Monster Energy Drink for a few seconds. The untreated glass had a distinct chemical, metallic like taste and aftertaste. The treated sample had a reduced chemical and metallic like taste as compared to the untreated glass and had a smoother taste to it.

Example 17

A bottle of Natures Nectar Apple Juice was opened and a partially empty bottle was stored in a refrigerator for 1 day exposing the apple juice to air. A test panel was given two different glasses of apple juice from the contents of this opened bottle. One glass was left untreated and the second glass was treated with the wand type device containing a polypropylene resin absorbent/adsorbent by stirring the wand in the apple juice for a few seconds. The untreated glass had a distinct off taste and aftertaste—difficult to describe but a volatile component involved in the taste and the aftertaste was not pleasant. The treated sample lacked the off taste and aftertaste of the untreated glass and tasted much better. Some comments from taste panel concerning the treated sample were "tasted freshly opened", "tasted like freshly squeezed apples".

Example 18

A bottle of Balsamic Vinegar of Modena was opened and a test panel was given two different glasses of Balsamic Vinegar from the contents of this bottle. One glass was left untreated and the second glass was treated with the wand type device containing a polypropylene resin absorbent/adsorbent by stirring the wand in the Balsamic Vinegar for a few seconds. The members of the taste panel were all surprised to experience a huge difference in the taste and flavors between the treated and untreated samples. The untreated glass gave an explosion of bitter, sour, and biting acid tastes and aftertastes. The treated sample lacked the bitter, sour, acidic biting over-tastes and revealed the underlying flavors of the balsamic vinegar and had a much smoother more pleasant taste to it. Really surprising!

Example 19

A bottle of Bud Light Beer was opened and a test panel was given two different glasses of Bud Light from the contents of this bottle. One glass was left untreated and the second glass was treated with the wand type device containing a polypropylene resin absorbent/adsorbent by stirring the wand in the Bud Light for a few seconds. The untreated glass had a distinct bitter taste and aftertaste. The treated sample lacked the bitter taste and aftertaste of the untreated glass and had a smoother more pleasant taste to it.

Example 20

A can of Miller High Life beer was opened and a test panel was given two different glasses of Miller High Life from the contents of this can. One glass was left untreated and the second glass was treated with the wand type device containing a polypropylene resin absorbent/adsorbent by stirring the wand in the Miller High Life beer for a few seconds. The untreated glass had a distinct bitter and sour taste and aftertaste. The treated sample lacked the bitterness of the untreated glass and the sour taste was diminished and the beer had a smoother more pleasant taste to it.

Example 21

A can of Boatswain American IPA beer was opened and a test panel was given two different glasses of the IPA beer from the contents of this can. One glass was left untreated and the second glass was treated with the wand type device containing a polypropylene resin absorbent/adsorbent by stirring the wand in the IPA beer for a few seconds. The untreated glass had a very bitter taste and aftertaste. The treated sample still had a bitter taste and aftertaste but this bitter taste was reduced as compared to the untreated glass.

Example 22

A bottle of Cline Cashmere red blend wine was opened and poured into two different glasses. One glass was left untreated and the second glass was treated with the wand type device containing a polypropylene resin absorbent/adsorbent by stirring the wand in the red wine for a few seconds. The untreated glass had a slight bitter aftertaste. The treated sample lacked the bitter aftertaste of the untreated glass and had a smoother more pleasant taste to it. The balance of the wine was allowed to age in a refrigerator for 3 days in a Savino wine preservation device. After the three days, two different glasses of the aged wine were poured into two different glasses. One glass was left untreated and the second glass was treated with the wand type device containing a polypropylene resin absorbent/adsorbent by stirring the wand in the red wine for a few seconds. The untreated glass had developed a stronger bitter taste over the 3 days. The treated sample lacked the bitterness of the untreated glass and had a smoother more pleasant taste to it. It tasted like a freshly opened bottle of the wine.

Example 23

A bottle Jack Daniel's Whiskey Old No 7 was opened and poured into two different glasses. One glass was left untreated and the second glass was treated with the wand type device containing a polypropylene resin absorbent/adsorbent by stirring the wand in the Jack Daniels for a few seconds. The untreated glass had a bitter aftertaste. The treated sample lacked the bitter aftertaste of the untreated glass and had a smoother more pleasant taste to it.

Example 24

A bottle of Woodford Reserve Kentucky Straight Bourbon was opened and poured into two different glasses. One glass was left untreated and the second glass was treated with the wand type device containing a polypropylene resin absorbent/adsorbent by stirring the wand in the Woodford Reserve for a few seconds. The untreated glass had a harsh front end taste and a bitter solvent hydrocarbon aftertaste. The treated sample had a much smoother front end and less bitter chemical taste and a less harsh aftertaste.

Example 25

A bottle of Bacardi Gold Rum was opened and poured into two different glasses. One glass was left untreated and the second glass was treated with the wand type device containing a polypropylene resin absorbent/adsorbent by stirring the wand in the Bacardi Rum for a few seconds. The untreated glass had a harsh bitter chemical taste with a bitter aftertaste. The treated sample had a much smoother front-end taste and much less chemical aftertaste. Treated sample was much more pleasant to drink.

Example 26

A sample of Ketal One Citroen Citrus Flavored Vodka was poured into two different glasses. One glass was left untreated and the second glass was treated with the wand type device containing a polypropylene resin absorbent/adsorbent by stirring the wand in the vodka for a few seconds. The untreated glass had a harsh chemical taste that tended to conceal the citrus flavor of the vodka along with a bitter aftertaste. The treated glass was much smoother tasting initially and the fruity flavor of the vodka was much more apparent with less chemical bitter aftertaste.

Example 27

A sample of Smirnoff Berry Lemon Vodka was poured into two different glasses. One glass was left untreated and the second glass was treated with the wand type device containing a polypropylene resin absorbent/adsorbent by stirring the wand in the flavored vodka for a few seconds. The untreated glass had a very harsh and irritating front end taste that concealed the lemon berry flavor of the vodka. The treated sample was much smoother tasting with no irritation of the tongue and mouth revealing the full fruit flavors infused in this vodka. Treated sample was much smoother to drink.

Example 28

A bottle of Jagermeister® 56 Botanicals drink was opened and poured into two different glasses. One glass was left untreated and the second glass was treated with the wand type device containing a polypropylene resin absorbent/adsorbent by stirring the wand in the Jagermeister® drink for a few seconds. The untreated glass had a strong irritating effect on the tongue and mouth making it hard to taste the underlying flavors. The treated sample lacked the burning irritating effect of the untreated sample on the mouth and tongue and was much smoother swallowing.

Example 29

A bottle of Fireball Cinnamon Whiskey™ was opened and poured into two different glasses. One glass was left untreated and the second glass was treated with the wand type device containing a polypropylene resin absorbent/adsorbent by stirring the wand in the whiskey for a few seconds. The untreated glass had a burning irritating effect on the tongue and mouth. The treated sample lacked the burning irritation of the untreated sample exposing the flavor of the whiskey and cinnamon flavor more fully.

Example 30

A sample of Blue Chain Bay Key Lime Rum Cream™ beverage was poured into two different glasses. One glass was left untreated and the second glass was treated with the wand type device containing a polypropylene resin absorbent/adsorbent by stirring the wand in the rum for a few seconds. The untreated glass had a harsh bitter chemical taste irritating to the tongue and mouth. The treated sample lacked the harsh bitter chemical initial taste exposing the key lime pie flavor infused in the rum.

Example 31

A sample of Tetley British Blend™ black tea was brewed and poured into two different containers. One container was left untreated and the second container was treated with a polypropylene spoon by stirring the spoon around in the tea. Tasting the two samples no difference in taste was noted. Both had a bitter taste and aftertaste. The polypropylene spoon was not sufficient to remove the unpleasant bitter taste of the tea.

Example 32

A sample of Tetley British Blend™ black tea was brewed and poured into two different containers. One container of tea was left untreated and the second container of tea was treated by mixing with a polypropylene spoon whose surface was roughened using 180 grit sandpaper. Tasting the two samples of tea no difference in taste was noted. Both samples had a bitter taste and after taste. The roughened polypropylene spoon was not sufficient to remove the bitter taste.

Example 33

A sample of Tetley British Blend™ black tea was brewed and poured into two different containers. One container of tea was left untreated and the second container was treated with a stack of 4 of the polypropylene spoons held so that there was about a ¼" gap between the spoons. Tasting the two different samples of tea no difference in taste was noted. Both samples had a bitter taste and after taste. The stack of 4 polypropylene spoons did not remove the bitter taste of the tea sample.

Example 34

A sample of Ti Kwan Yin™ oolong tea was brewed using 212° F. and poured into two different containers. One sample of the tea was left untreated and the second sample of tea was treated by stirring a container of polypropylene resin around in the tea. Tasting the two different samples of the oolong tea a slight difference was noted. The untreated sample of tea had a very slight bitter taste that was gone after treating with the polypropylene resin. The treated sample was not bitter and had a smoother taste to it.

Example 35

A sample of Rock™ Oolong Tea was brewed with 212° F. water and then divided into two different containers. One container of the tea was left untreated and a second container of tea was treated by stirring a container of polypropylene resin around in the tea for a few seconds. The untreated sample of tea had a slight bitter taste to it that was gone with the treated sample of tea. A difference in smell between the treated and untreated tea samples was also noted.

Example 36

A sample of Iron Silk™ pu-erh tea was brewed with 212° F. water and divided into two different containers. This tea was a blend of pu-erh tea, peppermint, clove, and licorice root. One container of the tea was left untreated while the second container was treated with polypropylene resin. The untreated sample tasted spicy with a slight bitter after taste. The treated sample was smooth tasting with no bitter after taste but the peppermint and clove flavors could still be tasted.

Example 37

A sample of Tetley British Blend™ black tea was brewed and divided into two different containers. One container was left untreated and the second container was treated with an EPDM resin containing a black pigment using a wand type device. The untreated sample had a bitter taste and after taste while the treated sample had no bitter taste or after taste.

Example 38

A sample of Tetley British Blend™ black tea was brewed and divided into two different containers. One container was left untreated and the second container was treated with a polymethyl pentene resin (TPX) using a wand type device. The untreated sample had a bitter taste and after taste while the treated sample had no bitter taste or after taste. The polymethyl pentene resin was also observed to remove the surface oil of the tea.

Example 39

A sample of Tetley British Blend™ black tea was brewed and divided into two different containers. One container was left untreated and the second container was treated with a polybutene-1 resin containing an orange pigment using a wand type device. The untreated sample had a bitter taste and after taste while the treated sample had no bitter taste or after taste. The polybutene-1 resin also was observed to remove the tea's surface oil.

There are options and alternatives that may be used within the scope of the present invention. It is also proposed herein that the use of surface specks or particles or metals known to have antimicrobial activity, such as copper and silver. The particles must be on the surface of the particles, which can be applied to the polypropylene fiber surfaces by applying (by spraying particles or dragging through particle beds) the extruded fibers while still tacky. These metal particles can reduce microbes, which can alter taste as well as the safety of the products. This is especially important with cold or room temperature prepared beverages where microbes will be more prevalent and active because the water has not been heated to temperatures capable of killing some microbes.

Some modest chemistry can be added into the polypropylene or as separate fibers blended with the polypropylene to further assist in removal of undesirable tastes in beverages. Undesirable tastes are tastes or specific chemicals that are known to adversely affect the taste of a beverage. As disclosed above, these chemicals and their impact on taste have been specifically and extensively categorized and named. The use of the technology in U.S. Pat. Nos. 10,182, 946; 9,901,946 are examples of superabsorbent particles (also fibers) referred to as SAP materials that can be blended into the polypropylene fibers to provide taste control and antimicrobial control. Adding particles of the bioactive metals (e.g., copper and silver) into the SAP materials will allow the beverage to penetrate into the fibers and contact the metal particles within the SAP fibers. Actives such as Vitamin C, citric acid, low concentration iodine and the like may be used. Chelating agents may be fixed by pegelating (chemically covalently binding with a bifunctional monomer capable of surface bonding with the polypropylene or other fibers)) complexing units to the polypropylene or other fibers to grasp and complex metallic undesirable impurities out of the beverage.

A relationship must exist between the available surface area for adsorption/absorption, volume of beverage being addressed and treatment time. The time can usually be reasonably flexible, so Applicants will consider a range of relationships between volume and adsorbent/absorbent treatment areas (the removal surface). Given a constant unit or measurement (e.g., cm as $cm^2$ and $cm^3$, the absolute number ratio of surface area of the active removal surface (in $cm^2$) to volume of the treated beverage may be from about 1/10 surface area/volume to 10/1 surface area to volume at any given time. For example, in bead beds, the surface area to volume ratio is likely to be the highest. Broader ranges such as 1/25 to 25/1 can be considered with time variations.

Other technologies known in the art may also be combined with the underlying performance of the invention. All documents cited herein are incorporated by reference in their entireties.

What is claimed is:

1. A method of reducing bitterness in an aqueous beverage comprising contacting the aqueous beverage with a wand (30) having a handle (32) and a body of the wand surrounded by a porous screen (36) which allows the liquid to flow into and through an adsorbing compound selected from the group consisting of i) hydrophobic-adsorbing polyolefin surfaces and ii) oleophilic-adsorbing polyolefin surfaces to adsorb an organic compound from the aqueous beverage having a bitter taste onto a surface of said 1) or ii), and removing the wand from the aqueous beverage.

2. The method of claim 1 wherein the aqueous beverage comprises a brewed aqueous beverage comprising coffee or tea comprising contacting the brewed aqueous beverage in a cup or glass of the aqueous beverage with the body of the wand containing oleophilic-adsorbing polyolefin surfaces to adsorb an organic compound having a bitter taste onto a surface of the oleophilic-absorbing polyolefin, and removing the wand from the brewed aqueous beverage while hot.

3. The method of claim 1 wherein the polyolefin is selected from the group consisting of a) ethylene polymers and copolymers; b) propylene polymers and copolymers; c) ethylene/propylene elastomers and synthetic olefinic rubbers; d) polymers and copolymers of higher alpha olefins; e) polymers and copolymers of cycloolefins and cyclodiolefins; and f) polymers formed from blends of 2 or more alpha olefins.

4. The method of claim 3 wherein the oleophilic-adsorbing polyolefin is selected from the group consisting of polyethylene polymers, polypropylene polymers, polyethylene copolymers, and polypropylene copolymers.

5. The method of claim 2 wherein the wand including the oleophilic-adsorbing polyolefin is present during brewing of the brewed aqueous beverage.

6. The method of claim 2 wherein the brewed aqueous beverage comprises coffee and the organic compound having a bitter taste is selected from the group consisting of 5-hydroxymethylfurfural, furfuryl acid, trigonelline, chlorogenic acid, caffeic acid, citric acid, malic acid, lactic acid, pyruvic acid, acetic acid and pyrazine.

7. The method of claim 2 wherein the brewed aqueous beverage comprises tea and the organic compound having a bitter taste is selected from the group consisting of methylxanthines, theobromine, theophytins and chlorophyll.

8. The method of claim 1 wherein the aqueous beverage is a fruit drink after homogenization of the fruit drink.

9. The method of claim 1 wherein the aqueous beverage is an alcoholic beverage selected from the group consisting of wine, liquor, beer and ale, and the aqueous beverage is contacted with the wand in a cup or glass of the aqueous beverage.

10. The method of claim 9 wherein the hydrophobic-adsorbing polyolefin is selected from the group consisting of polyethylene polymers, polypropylene polymers, polyethylene copolymers, and polypropylene copolymers.

11. The method of claim 9 wherein the hydrophobic-adsorbing polyolefin is polyethylene, polyethylene copolymer, polypropylene, polypropylene copolymer or a blend of polyethylene, polyethylene copolymer, polypropylene, polypropylene copolymer and other polymers having a specific gravity between 0.85 and 1.5.

12. A method of reducing bitterness in a brewed aqueous beverage comprising coffee or tea comprising contacting the brewed aqueous beverage with a wand (30) having a handle (32) and a body of the wand surrounded by a porous screen (36) which allows the aqueous brewed beverage to flow into and through adsorbing compound oleophilic-adsorbing polyolefin surfaces to adsorb an organic compound having a bitter taste onto a surface of the oleophilic-adsorbing polyolefin surfaces, and removing the brewed aqueous beverage from the oleophilic-adsorbing polyolefin surfaces, and the brewed aqueous beverage is contacted with the wand in a cup or glass of the aqueous brewed beverage.

13. The method of claim 12 wherein the oleophilic-adsorbing polyolefin surfaces are present during brewing of the brewed aqueous beverage.

14. The method of claim 13 wherein the oleophilic-adsorbing polyolefin surface is contacted with the brewed aqueous beverage during transportation of the brewed aqueous beverage after brewing has been completed.

15. The method of claim 12 wherein the brewed aqueous beverage comprises coffee and the organic compound having a bitter taste is selected from the group consisting of 5-hydroxymethylfurfural, furfuryl acid, trigonelline, chlorogenic acid, caffeic acid, citric acid, malic acid, lactic acid, pyruvic acid, acetic acid, pyrazine, 5-O-caffeoyl—and 5-O-feruloylquinic acid, 3-O-caffeoyl-γ-quinide, 4-O-caffeoyl-γ-quinide, 5-O-caffeoylepi-δ-quinide, 4-O-caffeoyl-muco-γ-quinide, 5-O-caffeoyl-muco-γ-quinide, 3-O-feruloyl-γ-quinide, and 4-O-feruloyl-γ-quinide, 3,4-O-dicaffeoyl-γ-quinide, 3,5-O-dicaffeoyl-epi-δ-quinide, and 4,5-O-dicaffeoyl-mucoγ-quinide.

16. The method of claim 12 wherein the brewed aqueous beverage comprises a tea and the organic compound having a bitter taste comprises chlorophyll, phenylalanine, quercetin, catechin, epicatechin, epicatechin gallate, epigallocatechin, epigallocatechin gallate, myricetin-3-galactoside, myricetin-3-glucoside, quercetin-3-glucosyl-rhamnosyl-galactoside, quercetin-3-glucosyl-rhamnosyl-glucoside, kaempferol-3-glucosyl-rhamnosyl-galactoside, kaempferol-3-glucosyl-rhamnosyl-glucoside, methylxanthines, theobromine and theophylline, theophytins, and catechins.

17. A method of modifying the taste of a beverage in a point of use device comprising a wand (30) having a handle (32) and a body of the wand surrounded by a porous screen (36) by contacting the beverage with an oleophilic-absorbing surface and/or hydrophobic-absorbing surface within the wand to adsorb undesirable taste components from the beverage and which oleophilic-absorbing surface and/or hydrophobic-absorbing surface is then regenerated by rinsing the oleophilic-absorbing surface and/or hydrophobic-absorbing surface with water at 60° C. or greater.

18. The method of claim 17 wherein the oleophilic-absorbing surface and/or hydrophobic-absorbing surface within the wand is selected from the group consisting of polyethylene polymers and copolymers or polypropylene polymers or copolymers.

19. A method of reducing bitterness in an aqueous alcoholic beverage comprising contacting the aqueous alcoholic beverage with a wand (30) having a handle (32) and a body of the wand surrounded by a porous screen (36) which allows the liquid to flow into and through an adsorbing particle compound selected from the group consisting of solid beads having i) hydrophobic-adsorbing polyolefin surfaces and ii) oleophilic-adsorbing polyolefin surfaces to adsorb an organic compound from the aqueous alcoholic beverage having a bitter taste onto a surface of said 1) or ii) and removing the wand from the aqueous alcoholic beverage.

20. The method of claim 19 wherein the body of the wand contains a resin bed of the adsorbent beads and the resin bed is constructed with a void area that allows a better flow of beverage through the resin bed by allowing the absorbent beads to move as the beverage flows through the resin bed.

* * * * *